(12) United States Patent
Bottari

(10) Patent No.: US 10,765,071 B2
(45) Date of Patent: Sep. 8, 2020

(54) ENCLOSING VEGETATIVE SHEATH

(71) Applicant: Mariplast North America, Inc., Greer, SC (US)

(72) Inventor: Francesco Bottari, Prato (IT)

(73) Assignee: Mariplast North America, Inc., Greer, SC (US)

( * ) Notice: Subject to any disclaimer, the term of this patent is extended or adjusted under 35 U.S.C. 154(b) by 417 days.

(21) Appl. No.: 15/712,205

(22) Filed: Sep. 22, 2017

(65) Prior Publication Data

US 2018/0084739 A1 Mar. 29, 2018

Related U.S. Application Data

(60) Provisional application No. 62/401,516, filed on Sep. 29, 2016.

(51) Int. Cl.
*A01G 13/02* (2006.01)
*A01G 13/10* (2006.01)

(52) U.S. Cl.
CPC ..... *A01G 13/0237* (2013.01); *A01G 13/0243* (2013.01); *A01G 13/105* (2013.01)

(58) Field of Classification Search
CPC . A01G 13/0237; A01G 13/0243; A01G 13/02
USPC .......................................................... 47/29.5
See application file for complete search history.

(56) References Cited

U.S. PATENT DOCUMENTS

| | | | |
|---|---|---|---|
| 115,531 A | 5/1871 | Schwageri | |
| 203,898 A | 5/1878 | Doak | |
| 223,093 A * | 12/1879 | Barnhill et al. | A01G 13/0243 47/32.4 |
| 283,837 A | 8/1883 | Wallace | |
| 316,262 A | 4/1885 | Hatmaker | |
| 404,757 A | 6/1889 | Webber | |
| 770,461 A | 9/1904 | Haggerty | |
| 1,704,801 A * | 3/1929 | Miller | A01G 13/0237 47/30 |
| 1,838,702 A * | 12/1931 | Partridge | A01G 13/0237 220/9.1 |
| 1,879,813 A * | 9/1932 | Molitor | A01G 13/0243 47/32.4 |
| 2,056,136 A * | 9/1936 | Hyatt | A01G 13/0243 47/32.4 |
| D162,243 S * | 2/1951 | Simmons | D8/1 |
| 2,563,202 A | 8/1951 | Wurzlow | |

(Continued)

FOREIGN PATENT DOCUMENTS

| | | |
|---|---|---|
| DE | 20320837 | 3/2005 |
| DE | 202006005633 | 7/2006 |

(Continued)

OTHER PUBLICATIONS

Plantra, Jump Start Vine Grow Tubes, http://www.plantra.com/GrowTubesForVines.aspx.

(Continued)

*Primary Examiner* — Monica L Barlow
*Assistant Examiner* — Aaron M Rodziwicz
(74) *Attorney, Agent, or Firm* — Burr & Forman LLP; Douglas L. Lineberry

(57) ABSTRACT

An enclosing plant sheath for encircling and protecting a plant stem or vine, which may be joined with other similar sheaths, to create a beneficial microenvironment for developing plants.

22 Claims, 25 Drawing Sheets

(56) References Cited

U.S. PATENT DOCUMENTS

| | | | |
|---|---|---|---|
| 3,375,607 A | | 4/1968 | Melvold |
| 3,403,519 A | | 10/1968 | Balko |
| 3,508,372 A | | 4/1970 | Wallerstein |
| 3,882,634 A | | 5/1975 | Dedolph |
| 4,700,507 A | * | 10/1987 | Allen ................ A01G 13/0243 47/32.4 |
| 4,721,408 A | | 1/1988 | Hewlett |
| 4,845,889 A | * | 7/1989 | Taylor ............... A01G 13/0237 47/32.4 |
| 4,899,486 A | | 2/1990 | Hurlstone |
| 4,901,472 A | * | 2/1990 | Donohue ........... A01G 13/0237 126/263.02 |
| 4,932,157 A | * | 6/1990 | Shimp ............... A01G 13/0237 47/32 |
| 4,969,555 A | * | 11/1990 | Fitzgerald ......... A01G 13/0237 206/423 |
| 4,980,991 A | * | 1/1991 | Kipnees ............ A01G 13/0237 47/2 |
| 4,995,191 A | * | 2/1991 | Davis ................ A01G 13/0237 47/32 |
| 5,090,155 A | | 2/1992 | Rodgers |
| 5,178,342 A | * | 1/1993 | Romagnoli ........... B65H 75/18 242/118.1 |
| 5,323,566 A | | 6/1994 | Mills |
| 5,345,711 A | | 9/1994 | Friesner |
| 5,347,750 A | * | 9/1994 | Mills ................. A01G 13/0243 47/30 |
| 5,375,368 A | | 12/1994 | Motz, Jr. |
| 5,428,922 A | | 7/1995 | Johnson |
| 5,479,741 A | * | 1/1996 | Underwood ....... A01G 13/0237 24/20 EE |
| D368,835 S | * | 4/1996 | Weber .............................. D8/1 |
| 5,513,466 A | | 5/1996 | Mercier |
| 5,692,337 A | | 12/1997 | Motz |
| 5,702,063 A | * | 12/1997 | Bottari ................ B65H 75/28 242/125.2 |
| 5,809,690 A | | 9/1998 | Due |
| 5,881,441 A | | 3/1999 | Pleschiutschnigg |
| D409,057 S | * | 5/1999 | Wagner ............................. D8/1 |
| 5,970,653 A | | 10/1999 | Liang |
| D429,125 S | * | 8/2000 | Ingleton ........................... D8/1 |
| 6,138,404 A | | 10/2000 | King |
| D436,505 S | * | 1/2001 | Mann ............................. D25/131 |
| 6,295,760 B1 | | 10/2001 | Weder |
| 6,357,172 B1 | | 3/2002 | Risgaard et al. |
| 6,378,459 B1 | * | 4/2002 | Potente ............. A01K 39/0113 119/428 |
| D614,004 S | * | 4/2010 | Vouvalides ....................... D8/1 |
| 7,690,151 B2 | | 4/2010 | Wilkes |
| 7,703,237 B2 | | 4/2010 | Cho |
| D644,143 S | * | 8/2011 | Hollihan ...................... D11/143 |
| D646,193 S | * | 10/2011 | Hashimoto .................. D11/143 |
| 8,141,293 B2 | * | 3/2012 | Ronneke ............ A01G 13/0243 47/65.7 |
| 8,171,668 B2 | | 5/2012 | Lais |
| 8,181,386 B1 | * | 5/2012 | Riley, Jr. ............ A01G 13/0243 47/29.1 |
| 8,307,580 B2 | | 11/2012 | Lais |
| 8,533,991 B2 | | 9/2013 | Lais |
| 8,683,741 B2 | * | 4/2014 | Castagno ............. A01G 13/043 206/423 |
| 8,745,920 B1 | * | 6/2014 | Mills ................. A01G 13/0243 47/29.6 |
| D787,283 S | * | 5/2017 | Horvath ........................... D8/1 |
| D797,573 S | * | 9/2017 | Bottari ......................... D11/143 |
| D816,438 S | * | 5/2018 | Beutler ............................ D8/1 |
| 2002/0038526 A1 | | 4/2002 | Garrofe Morreres |
| 2003/0056434 A1 | | 3/2003 | Gleadall |
| 2003/0140554 A1 | * | 7/2003 | Whitcomb ......... A01G 13/0237 47/32.4 |
| 2004/0134125 A1 | | 7/2004 | Weder |
| 2005/0172549 A1 | * | 8/2005 | Allen ................ A01G 13/0237 47/32.4 |
| 2010/0299993 A1 | * | 12/2010 | Lais ................... A01G 13/0243 47/29.4 |
| 2011/0258923 A1 | * | 10/2011 | Lais ................... A01G 13/0243 47/32.6 |
| 2011/0277382 A1 | | 11/2011 | Davis |
| 2013/0221190 A1 | | 8/2013 | Bermudez Perez et al. |
| 2014/0208647 A1 | | 7/2014 | Carpenter |

FOREIGN PATENT DOCUMENTS

| | | |
|---|---|---|
| EP | 0049122 | 4/1982 |
| EP | 0556696 | 8/1993 |
| FR | 2365375 | 4/1978 |
| GB | 2446041 | 7/2008 |
| GB | 2448903 | 11/2008 |
| NL | 1002176 | 7/1997 |
| WO | WO2016070207 | 5/2016 |

OTHER PUBLICATIONS

Double A Vineyards, Blue-X Vine Shelters, https://doubleavineyards.com/blue-x-vine-shelters.

Stuewe & Sons, Inc., Zipset, http://www.stuewe.com/products/zipset.php.

* cited by examiner

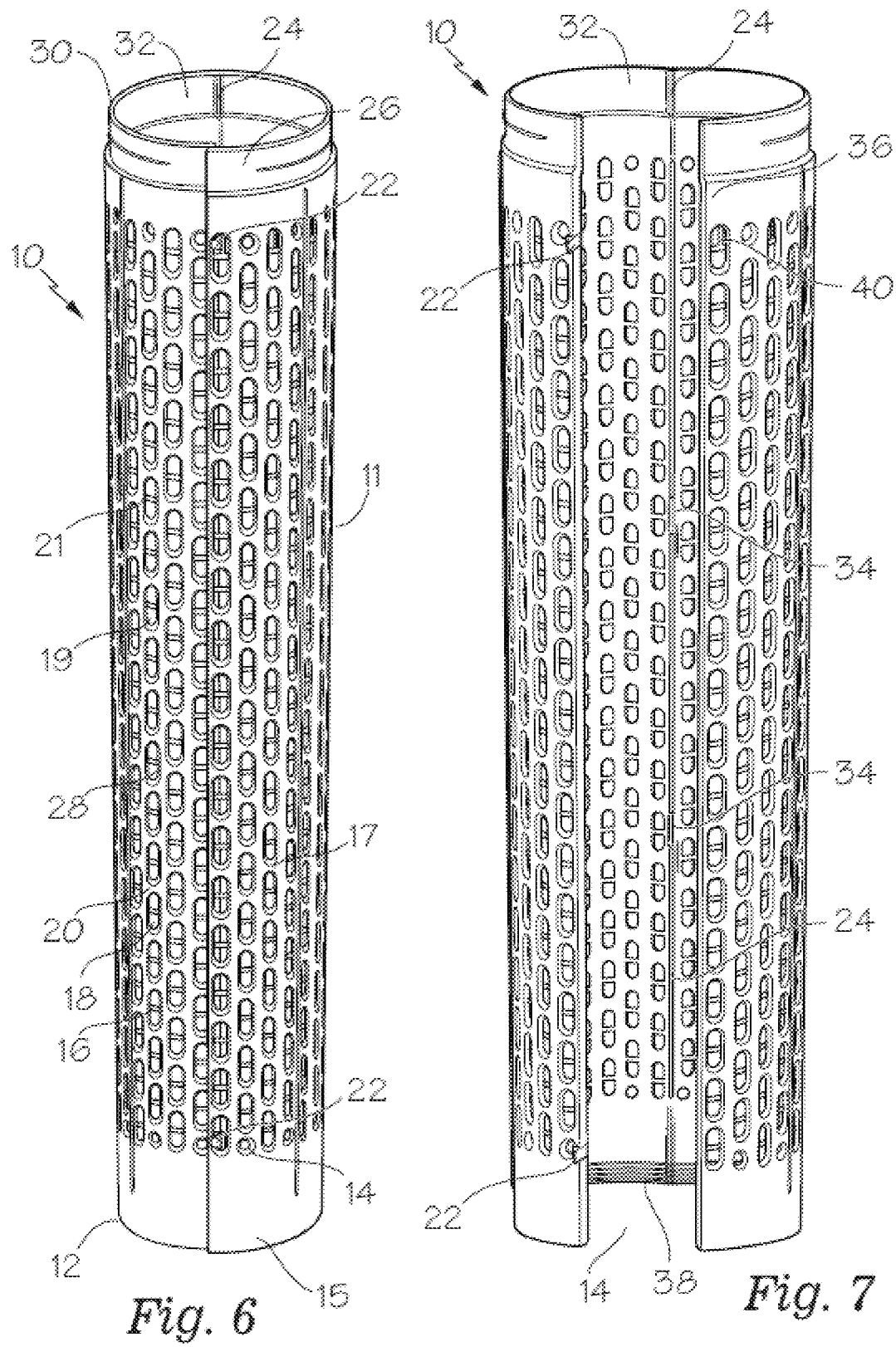

TABLE 1

Growth Comparison Table (cm)

| Date | Note | No Shelter | Other Shelter | Small Oso | Large Oso | Growth % Large Oso vs NO Shelter | Growth % Large Oso vs other Shelter |
|---|---|---|---|---|---|---|---|
| 04/21/16 | Planted All Vines | 10 | 10 | 10 | 10 | | |
| 05/27/16 | First Measurement | | | | 45 | | |
| 07/11/16 | Second Measurement | | | | 120 | | |
| 08/13/16 | First Comparison | 80 | 120 | 148 | 155 | 93.75 | 22.58 |
| 08/29/16 | Third Measurement | 110 | | | 185 | 68.18 | |
| 09/12/16 | Second Comparison | 140 | 210 | 243 | 255 | 82.14 | 17.65 |

Fig. 17

ENCLOSING VEGETATIVE SHEATH

BACKGROUND OF THE INVENTION

1) Field of the Invention

The present invention relates to an enclosing plant sheath for encircling and protecting a plant stem, which may be joined with other similar sheaths, to create a beneficial microenvironment for developing plants.

2) Description of Related Art

Methods of assisting plants to grow have existed since humans first began farming. This includes the application of water and fertilizers as well as use of pest management techniques to ensure healthy plant growth. For instance, U.S. Pat. No. 7,703,237 is directed to an apparatus for cultivating cucumbers and eggplants. As shown via FIG. 1, the device includes a fastening element for allowing an opened cover body to be fastened into a closed state or a closed cover body to be separated into an opened state by causing a catching protrusion opened along the longitudinal direction of the cover body, and a plurality of catching steps, to allow the cover body to be coupled and fastened when catching steps are hooked on a catching protrusion, and a cover body distortion prevention projection formed protruding from the catching protrusion to fix opposite sides of each of the catching steps when each catching step is hooked on the catching protrusion. Cover body separation/opening supports are formed, respectively, on the top of each catching step and on the catching protrusion such that the fastened cover body can be unfastened and opened. However, this device cannot engage and encircle the stem of a plant, nor could it be joined to other such devices given the construction of the device.

UK Patent Application GB 2,446,041, as shown by FIG. 2, discloses a horticultural vertical planter comprising a thin walled vessel formed from a thin sheet of rectangular waterproof material the long edges of which are joined to form the vessel and the bottom of which is provided with a means of closure. The vertical surface of the vessel is cut at intervals forming openings into which thin walled retaining inserts can be secured. When assembled the vessel can be filled with compost or other growing medium and planted at the top and through the openings in the surface with a variety of flowering plants, fruits or vegetables. First and second containers may optionally be used together to achieve a different effect. When not in use, the planter can be disassembled for storage as flat sheet material. This device also does not engage and enclose the stem of a plant, nor could it be joined to other such devices given the structure of the device.

DE 20320837, as shown via FIG. 3, discloses a plant holder that has a cylindrical wall parallel to the longitudinal axis of the holder and with two ends. The wall has openings to receive the plants. The wall can be in one piece with the plant receiving openings extending through it. The openings can be arranged in groups. However, this device also does not interface with nor enclose a plant stem, nor can it be joined to other such devices to provide protection for taller stems.

DE 202006005633 discloses, as shown in FIG. 4, a pipe provided with a multitude of slots or holes and closed at the top with a cap assembled of an upper and a lower part. The parts are provided with complementary threaded segments facilitating an adjustment of the height. A collar located at the lower part and a conical ring at the outer surface of the pipe prevent an axial sliding. This device also fails to be capable of engaging and encircling the stem of a plant as well as cannot be joined with other such devices.

U.S. Patent Application No. 2011/0277382 discloses an adjustable stake assembly, see FIG. 5. The device has a stake support appointed to receive at least one stake segment to form a structure, such as a plant support, lattice, fence, plant holder, recreational or decorative structure. The adjustable stake assembly includes a universal stake support having a tip appointed to penetrate a surface, a body portion and a top plate having a protrusion with a stake aperture integrated therein. At least one stake segment having a central portion and a lateral and distal end is appointed to be removably snapped-onto the universal stake support. The stake segment includes a flange appointed to be received in the stake aperture of the universal stake support, and the distal end having a segment aperture integrated therein appointed for receiving another stake segment for vertically stacking a plurality of the stake segments. In another embodiment the stake segments include at least one lateral connector section appointed for receiving at least one lateral connector section of another stake segment for cross-connection of the stake segments in relation to one another. Advantageously, in this manner the stake segments can be interconnected to one another for horizontal cross-connection in forming lattices, fences, or other structures. This device, too, does not enclose a plant stem, nor can it be joined to other such devices to encircle and provide protection for taller stems.

With the use of mechanized farming equipment running up rows of plants and the need to maintain a field free of constricting weeds, as well as provide protection from herbicides, fertilizer application and pests, what is needed in the art is an easy to apply and removable structure for enclosing plant stems or vines, while improving vertical growth and creating a favorable micro-environment for the plants enclosed within the sheath, that may be joined with other such devices to provide variable height and width protection for the enclosed plant. Accordingly, it is an object of the present invention to provide an enclosing plant sheath for encircling and protecting a plant stem, which may be joined with other similar sheaths for protecting taller or wider plant stems or vines.

SUMMARY OF THE INVENTION

A protective sheath that may include an enclosing body capable of being repeatedly opened and closed, at least one locking tab defined on the enclosing body, at least one locking slot, defined within the enclosing body, that accommodates the locking tab, at least one flexible hinge defined in the enclosing body, at least one engagement nib formed on the enclosing body, at least one engagement orifice that accommodates the at least one engagement nib, and the enclosing body closes to define an interior diameter.

In a further embodiment, the protective sheath may be opened to form a flat configuration. Still further, there may be at least two flexible hinges. Further yet, the engagement nib may comprise at least one angled face. Furthermore, the engagement orifice may be non-parallel to an end of the protective sheath. Still yet further, a first sheath may be vertically engaged with a second sheath via the at least one engagement nib of the first sheath and the at least one engagement orifice of the second sheath. Even further, the internal diameter defined by the enclosing body may be expanded or contracted and locked in the expanded or contracted position via the at least one locking tab engaging different locking slots defined within the enclosing body. Additionally, a first sheath may be laterally engaged to a second sheath via the at least one locking slot of the first sheath engaging with the at least one locking tab of the second sheath. Still yet further, voids may be defined within the enclosing body. Even further, portions of the voids may be at least partially filled. Further yet, the enclosing body comprises at least two body segments.

In an alternative embodiment, a microenvironment container is disclosed. The container may include an encompassing body having an adjustable internal diameter, at least one locking prong defined on the encompassing body, at least one locking trench, defined within the encompassing body, that accommodates the locking prong, at least two flexible hinges defined in the encompassing body, at least one extension prong formed on the encompassing body, and at least one extension orifice, defined in the encompassing body, that accommodates the at least one extension prong.

Further, the encompassing body may be opened to form a substantially flat configuration. Still further, the extension prong may comprise at least one face that forms an obtuse angle with an exterior of the encompassing body. Even further, the engagement orifice may be located adjacent an end of the encompassing body and is non parallel to the end of the encompassing body. Further yet, a first encompassing body may be vertically engaged with a second encompassing body via the at least one extension prong of the first encompassing body and the at least one extension trench of the second sheath. Furthermore, the internal diameter defined by the encompassing body may be expanded or contracted and disengagingly locked in an expanded or contracted position. Still yet further, a first enclosing body may be laterally affixed to a second enclosing body via the at least one locking prong of the first sheath engaging with the at least one locking orifice of the second sheath. Even further, depressions may be defined within the encompassing body. Further yet, portions of the depressions may be at least partially open. Yet still further, the encompassing body may comprise at least three body segments.

In another alternative embodiment, an adjustable containment barrier is provided. The barrier may include at least one nib and at least one orifice for vertical extension of the containment barrier, at least one slot and at least one tab for lateral extension of the containment barrier, a securement ridge for accommodating vertical extension, at least two flexible hinges formed in the containment barrier, and the containment barrier forms an adjustable internal diameter by locking into place to define at least two different internal diameters.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIG. 6 shows one embodiment of the current disclosure of an enclosing vegetative sheath.
FIG. 7 shows the embodiment of FIG. 6 in an open configuration.
FIG. 16 B shows a photograph of a young plant of the test group enclosed within a sheath of the current disclosure.
FIG. 16 C shows a photograph of further growth of one test plant enclosed within a sheath of the current disclosure during the field experiment.
FIG. 16 D shows a photograph of even further growth of a test plant enclosed within a sheath of the current disclosure.
FIG. 16 E shows a photograph of plants enclosed in a sheath of the current disclosure demonstrating improved growth over plants using other types of enclosures and no enclosures.
FIG. 17 shows TABLE 1 which provides growth data for plants using one embodiment of a sheath of the current disclosure as compared to plants with no enclosure and a solid sheath enclosure.

Figure 1:
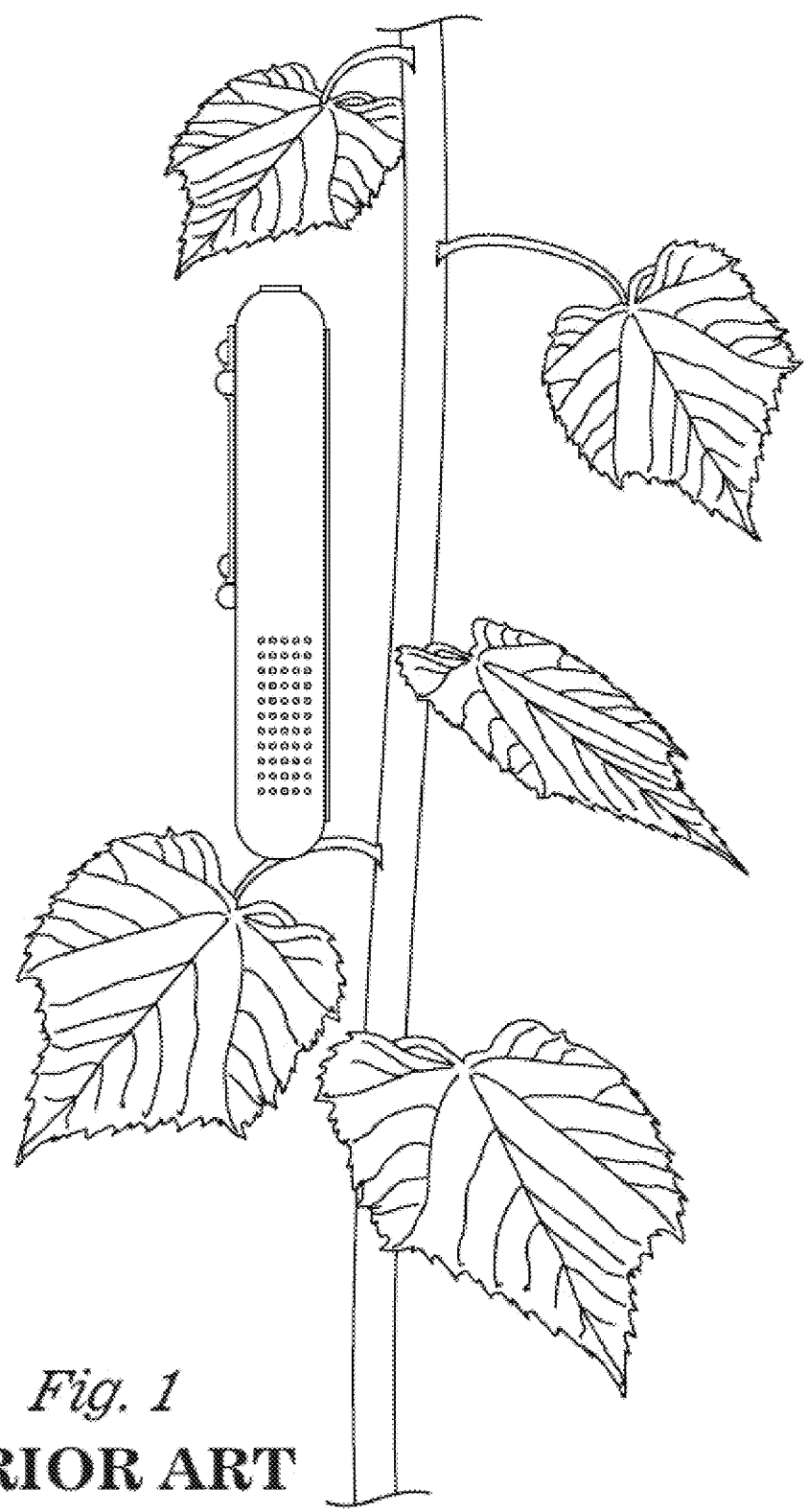
FIG. 1 shows a prior art device for cultivating eggplants or cucumbers.
Figure 2:
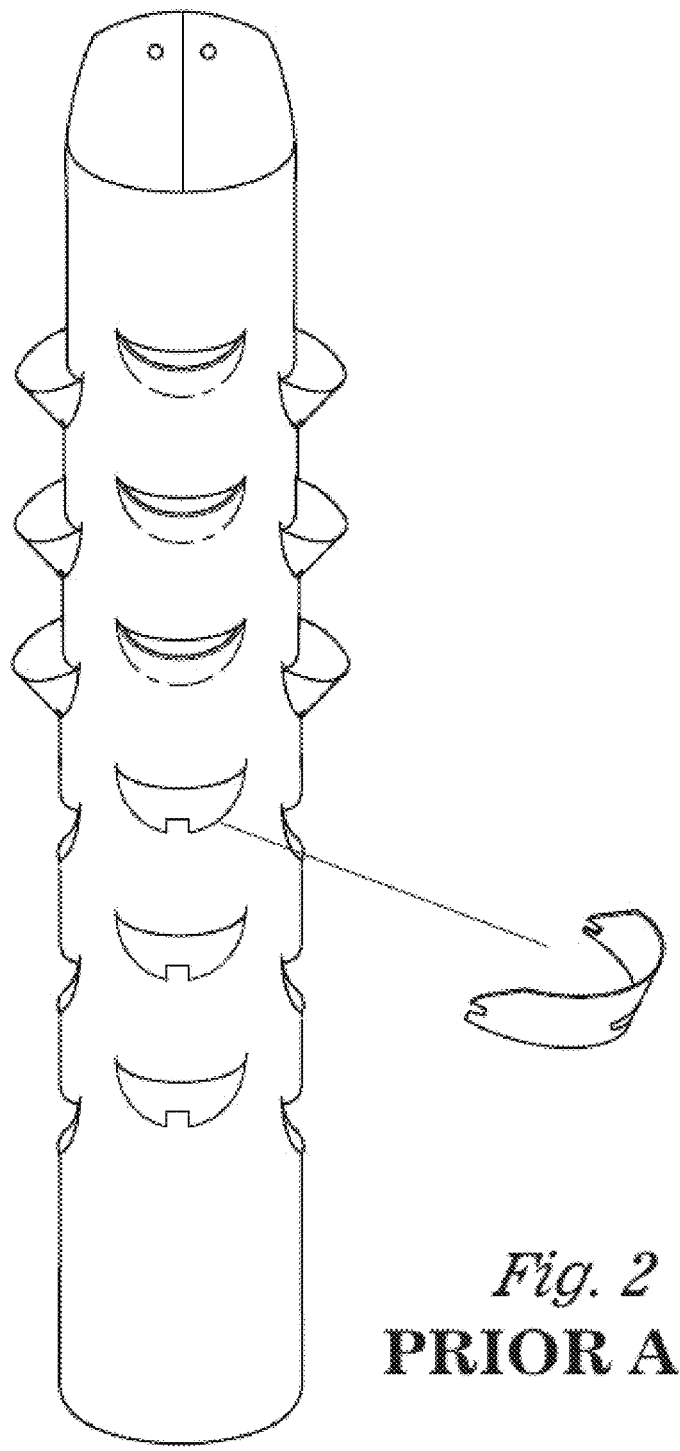
FIG. 2 shows a prior art vertical planter.
Figure 3:
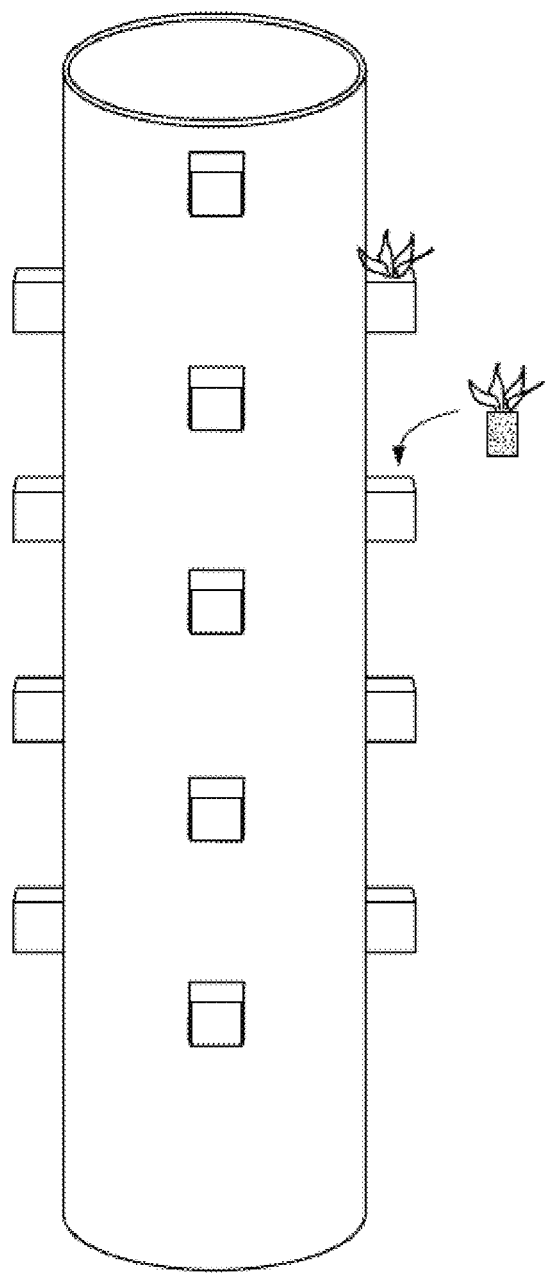
FIG. 3 shows a prior art plant holder.
Figure 4:
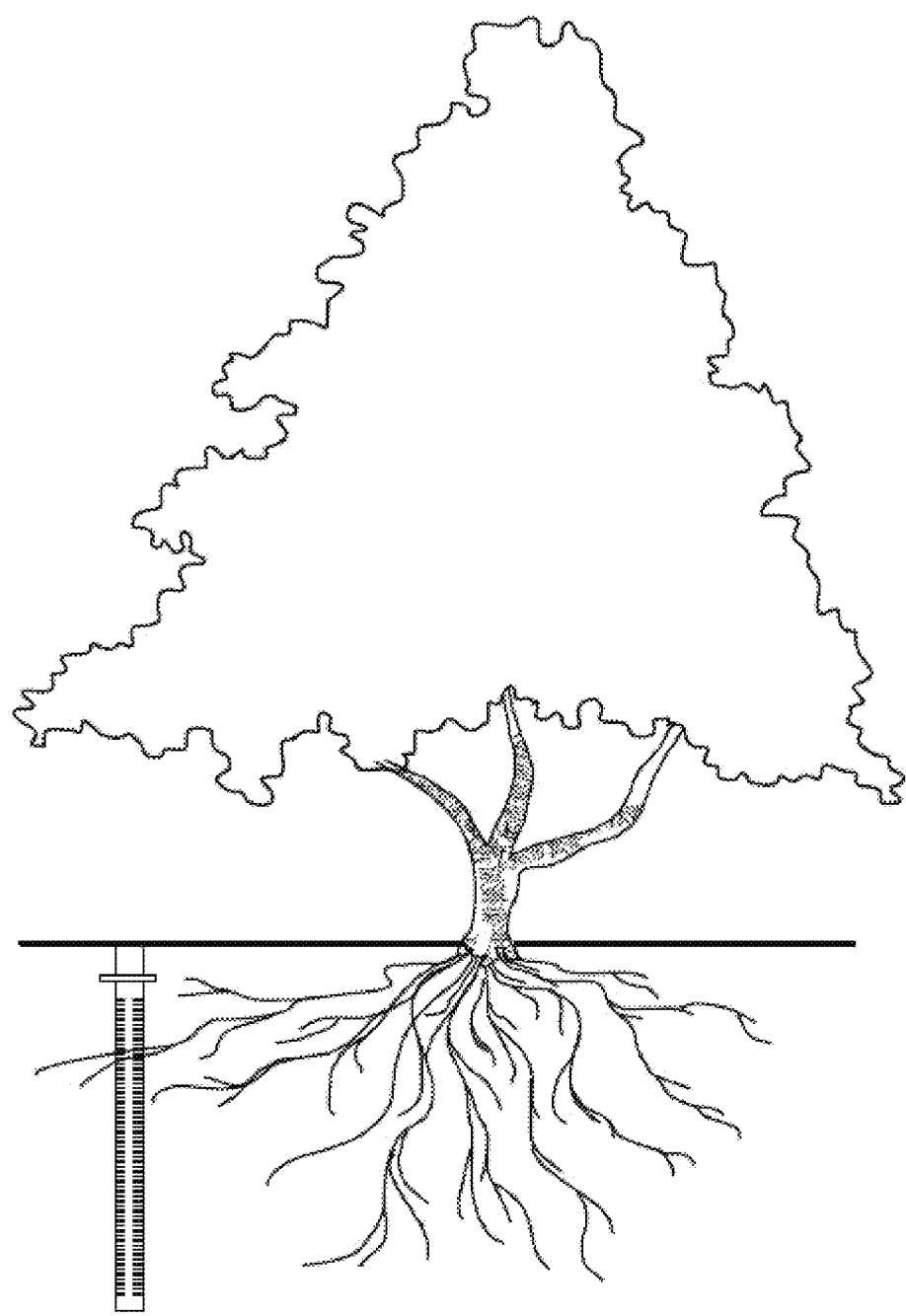
FIG. 4 shows a prior art water/aeration pipe for tree roots.
Figure 5:
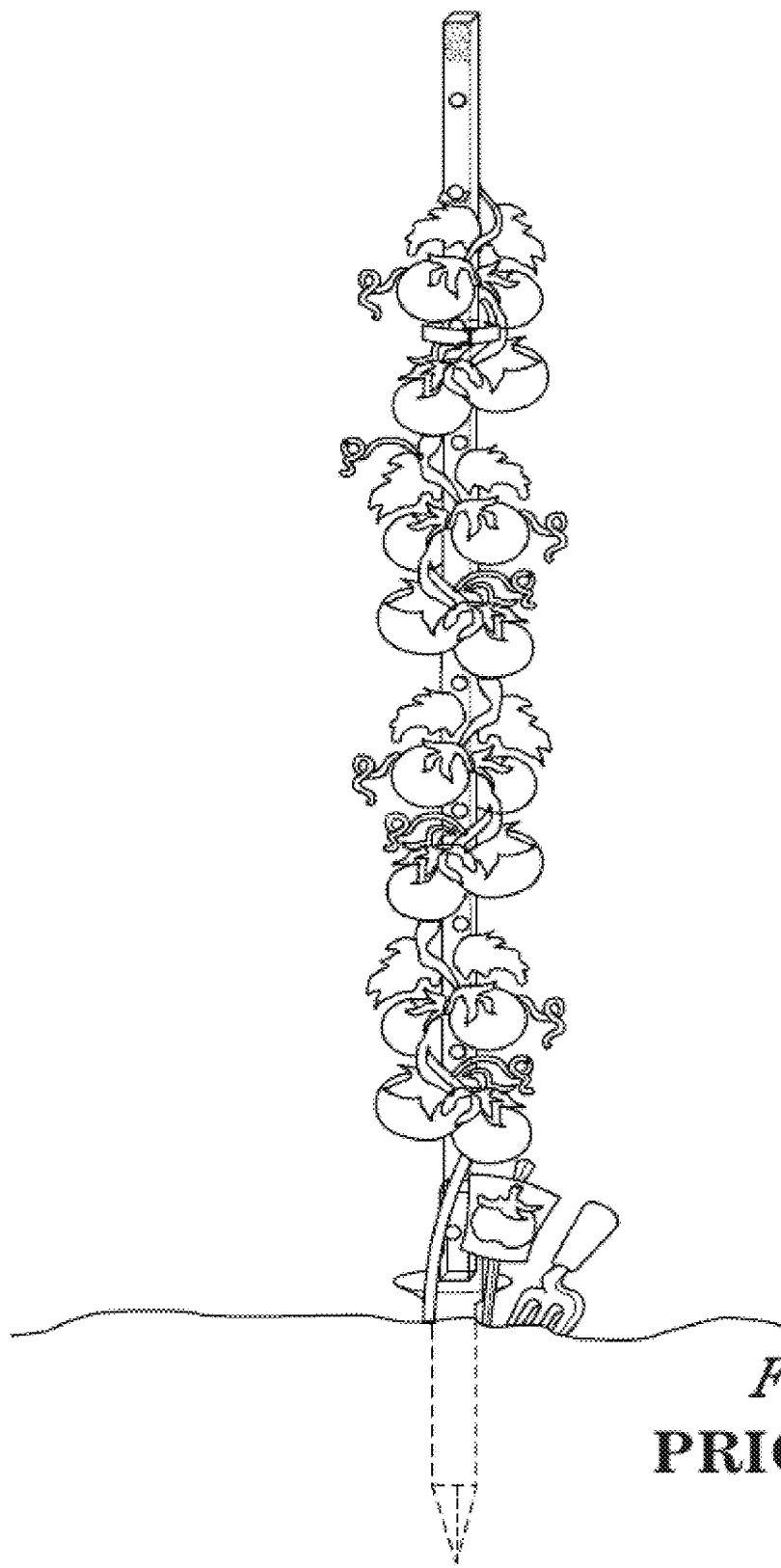
FIG. 5 shows a prior art plant support structure.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

DETAILED DESCRIPTION OF A PREFERRED EMBODIMENT

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

FIG. 6 shows one embodiment of an enclosing plant sheath 10 of the current invention in a closed configuration 11. Sheath 10 may be made from a wide variety of materials and may be produced in a wide variety of colors, including customized colors and patterned colors for allowing sheath 10 to blend into the environment in which it is located in order to match soil, plant, or background colors in order to make sheath 10 less noticeable upon visual inspection. Sheath 10 may be formed from metals, plastics, nonwovens, synthetics, non-biodegradable materials, biodegradable materials, recycled materials, etc., as known to those of skill in the art. In a preferred embodiment, sheath 10 is formed from a 100% recyclable material. In a further embodiment, the preferred material is polypropylene. In a still further environment, the sheath may be formed from a copolymer of polypropylene. In a still even further embodiment, the sheath may be formed from a copolymer of polypropylene that is embedded with materials resistant to UV degradation. In one embodiment, sheath 10 has a clamshell style opening silhouette 38, see FIG. 7.

Sheath 10 includes a first end 12, a first aperture 14, first mating mechanism 15, a continuous sidewall 16 that defines access apertures 18 in a sidewall surface 17, containment grid 20, locking mechanism 22, flexible hinge 24, second mating mechanism 26, containment cavity 28, second end 30, and second aperture 32.

In use, sheath 10 may be positioned at the base of a plant or vine and then closed in a clam shell type fashion to enclose the stem of the plant or vine to protect the same from damage from mechanical weed removal methods, such as a WEEDEATER®, application of ROUND-UP®, damage from farm implements coming into contact with the stem or vine, as well as preventing pests, such as deer, rabbits, etc., from eating leaves or stripping bark from the vine or stem, blocking insects from access to the stem, as well as blocking herbicides and reducing solid fertilizers from contacting the stem or vine. Further, the design of sheath 10, including the use of flexible hinge 24, allows the user to remove and reuse the sheath from plating season to planting season, simply by opening sheath 10 at flexible hinge 24 and either place sheath 10 on a plant or removing from a plant.

Continuous sidewall 16 of sheath 10 may be made in a variety of diameters and heights depending on the vegetation with which sheath 10 may be used. Further, first aperture 14 and second aperture 32 may be formed in a variety of shapes such as circular, ellipsoid, parallelogram, polygon, etc. as known to those in the art. The shape of the apertures may vary based on the shape of the vegetation being protected with vines requiring a substantially circular opening while trees with squared trunks, such as cottonwood trees with square trunks as found in Panama, require a parallelogram or polygon shaped sidewall 16 for maximum protection. In a preferred embodiment, apertures 14 and 32 may be substantially circular.

Further, continuous sidewall 16 may contain sidewall apertures 18 that define voids 19 in sidewall surface 17 of continuous sidewall 16. Sidewall apertures 18 may be in a variety of shapes such as circular, ellipsoid, parallelogram, polygon, etc., as known to those of skill in the art. Sidewall apertures 18 may assist with creating a favorable micro environment for the vine or stem enclosed in sheath 10 by allowing sunlight and airflow access to the plant while blocking pests and protecting against physical damage. To further aid in this, sidewall apertures 18 may include sidewall aperture crossbars 21 which may be placed or formed in void 19 defined by sidewall aperture 18 in order to block assess by insets and smaller pests. In a preferred environment, sidewall apertures 18 form a ventilated microclimate that improves the rate of growth of young plants. Further, apertures 18 allow the application of nutrients, fertilizers, pesticides, etc., in a liquid, solid, dust, particulate or other application structure as known to those of skill in the art, form as sheath 10 and apertures 18 do not completely block access by liquids to the plant within sheath 10.

In a further embodiment, continuous sidewall 16 may be impregnated with a variety of scents or pheromones such as low molecular weight compounds that either attract or deter insects and animals. For example, low molecular weight compounds may serve to attract pollinators or desired wildlife, such as honeybees, or to deter harmful insects and mammals, such as keeping away apple maggots, rabbits, deer, etc. The scents or pheromones may be dispersed within sidewall surface 17 of continuous sidewall 16 as it is formed in microspores or other means as known to those of skill in the art. In one embodiment, sheath 10 may be formed via injection molding.

Flexible hinge 24 may be formed as a continuous hinge in sidewall surface 17 of continuous sidewall 16 extending from first aperture 14 to second aperture 32. In other embodiments, flexible hinge 24 may only extend partially between first aperture 14 and second aperture 32. In a further embodiment, flexible hinge 24 may be discontinuous along sidewall surface 17 of continuous sidewall 16 such that flexible hinge 24 is made of a series of individual joinings 34 that allow sheath 10 to open and close, see FIG. 7, which shows sheath 10 in an open configuration 36.

Figure 8A:
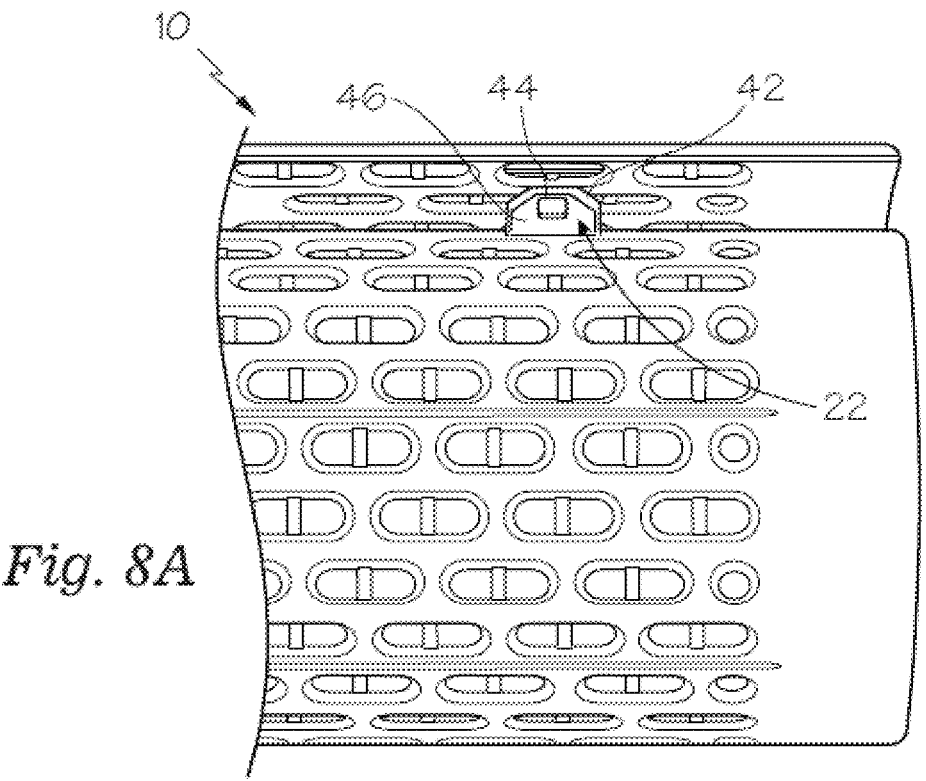
FIGS. 8A, 8B, and 8C show one embodiment of a locking mechanism for a sheath of the current disclosure.
Figure 8B:
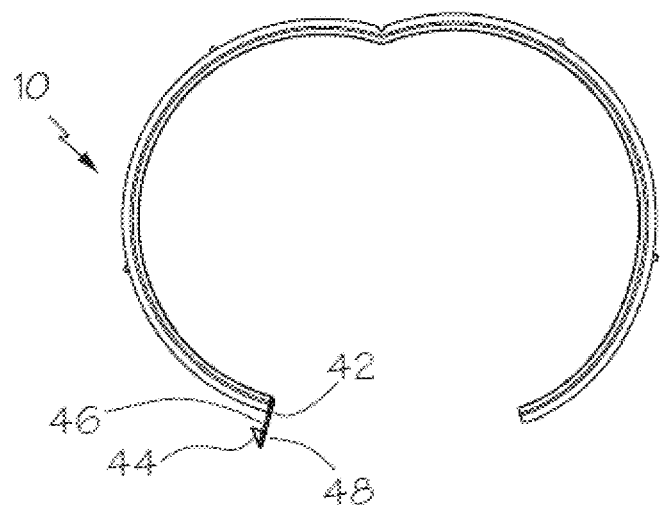
Figure 8C:
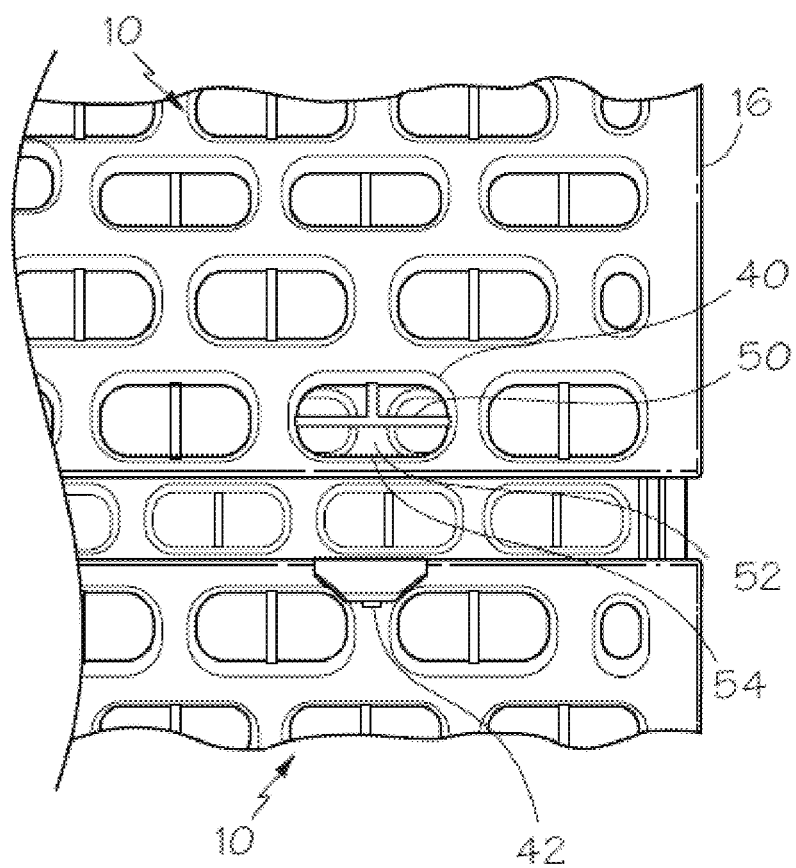

Locking mechanism 22 may be used to keep continuous sheath 10 in a closed position. Locking mechanism 22 cooperates with locking engagement mechanism 40 to close and secure sheath 10 in a closed position. Locking mechanism 22 may frictionally engage with locking engagement mechanism 40 via male/female engagement, hook and loop engagement, clasps, anchors, twist mechanisms that insert and twist to secure, barbs, bumps, grooves, mating grooves, openings, channels, surface roughening, coverings, and coatings, etc., as known to those of skill in the art, to ensure cooperate and engagement between locking mechanism 22 and locking engagement mechanism 40 to lock sheath 10 in closed position 11. As shown by FIGS. 8A, 8B, and 8C, in a preferred embodiment, locking mechanism 22 may form a tab 42 containing protrusion 44 on engaging surface 46 of tab 42, see FIG. 8A. FIG. 8B shows a side profile of FIG. 8A showing tab 42 in profile. Although engaging surface 46 is shown containing tab 42, this disclosure is not so limited and opposite surface 48 may also contain engagement means the same or different than tab 42. FIG. 8C shows a close-up view of locking engagement mechanism 40. As FIG. 8C shows, protrusion engagement bar 50 serves to frictionally engage tab 42 when tab 42 is inserted through locking opening 52. Protrusion 44, depending on its placement on tab 42, may rest upon engagement bar 50 or locking sidewall 54 when tab 42 extends through locking opening 52. In a preferred embodiment, protrusion 44 rests on locking sidewall 54 to secure sheath 10 in closed configuration 11, see FIG. 6.

Figure 9A:
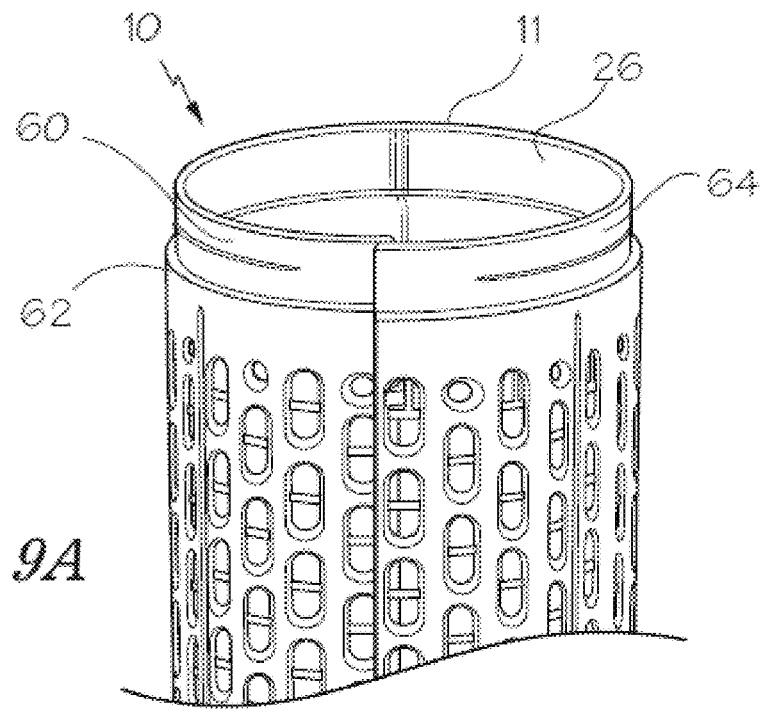
FIG. 9A shows a close up view of one embodiment of a second mating mechanism of the current disclosure with the sheath in the closed configuration.
Figure 9B:
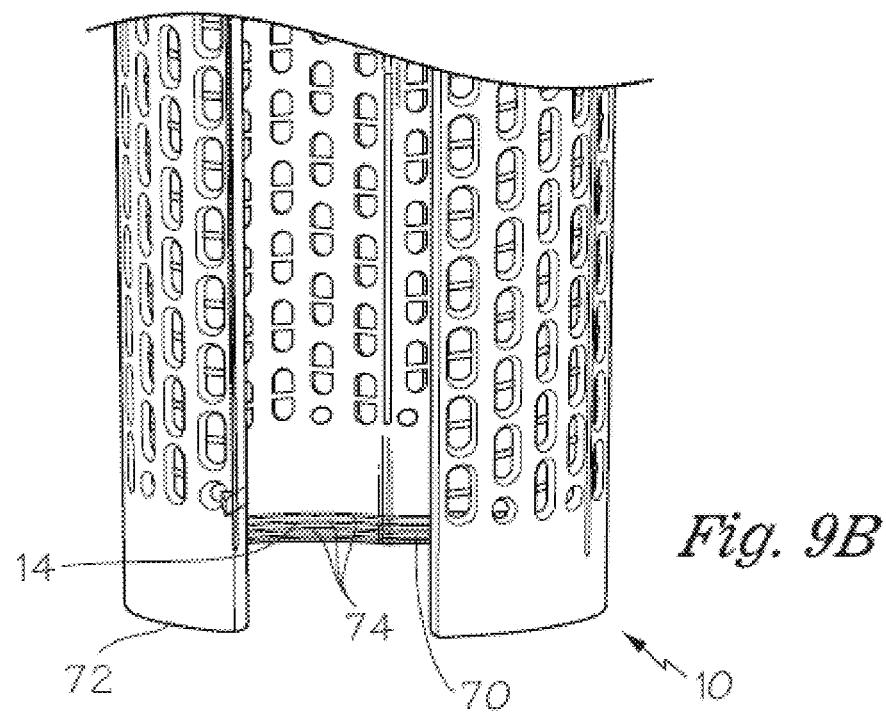
FIG. 9B shows a close up view of one embodiment of a first mating mechanism of the current disclosure with the sheath in the closed configuration.

One achievement of the current enclosure is the ability to use multiple sheaths 10 to protect a plant. As shown by FIGS. 9A, 9B, 9C, and 9D, sheath 10 includes first mating mechanism 15 and second mating mechanism 26, see FIG. 6. Viewing FIGS. 9A and 9B, FIG. 9A, shows a close up view of second mating mechanism 26 with sheath 10 in closed configuration 11. Second mating mechanism 26 includes mating coupler 60 and mating shelf 62. Mating coupler 60 is formed to slide into first aperture 14, see FIG. 9B, and frictionally engage securing mechanism 70 with mating shelf 62 engaging securing ring 72. Securing mechanism 70 is shown as a series of securing members 74 for gripping outer mating surface 64 of second mating mechanism 26. While securing members 74 are shown as a series of ridges, the current disclosure is not so limited. Securing member 74 and outer mating surface 64 may be configured and shaped to frictionally engage one another as known in the art, via methods such as frictional engagement via male/female cooperating structures, opposing mating geometries that engage and secure sheaths 10 to one another via first end 12 on a first sheath and second end 30 of a second sheath 10, hook and loop engagement, clasps, anchors, twist mechanisms that insert and twist to secure, barbs, bumps, grooves, openings, channels, surface roughening, coverings, and coatings, etc. as known to those of skill in the art. Thus, a user may secure multiples sheaths 10 to one another in order to reach a desired height and protect even tall vegetation.

Figure 9C:
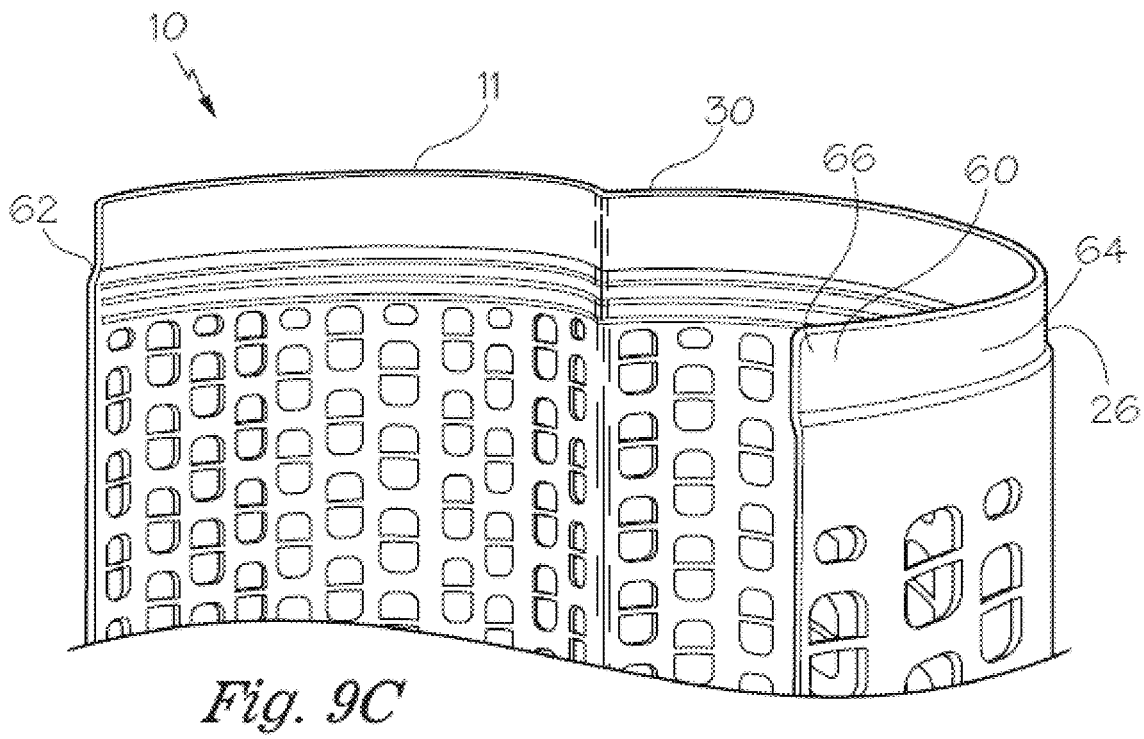
FIG. 9C shows a close up view of a second end of one embodiment of a sheath of the current disclosure in open position.
Figure 9D:
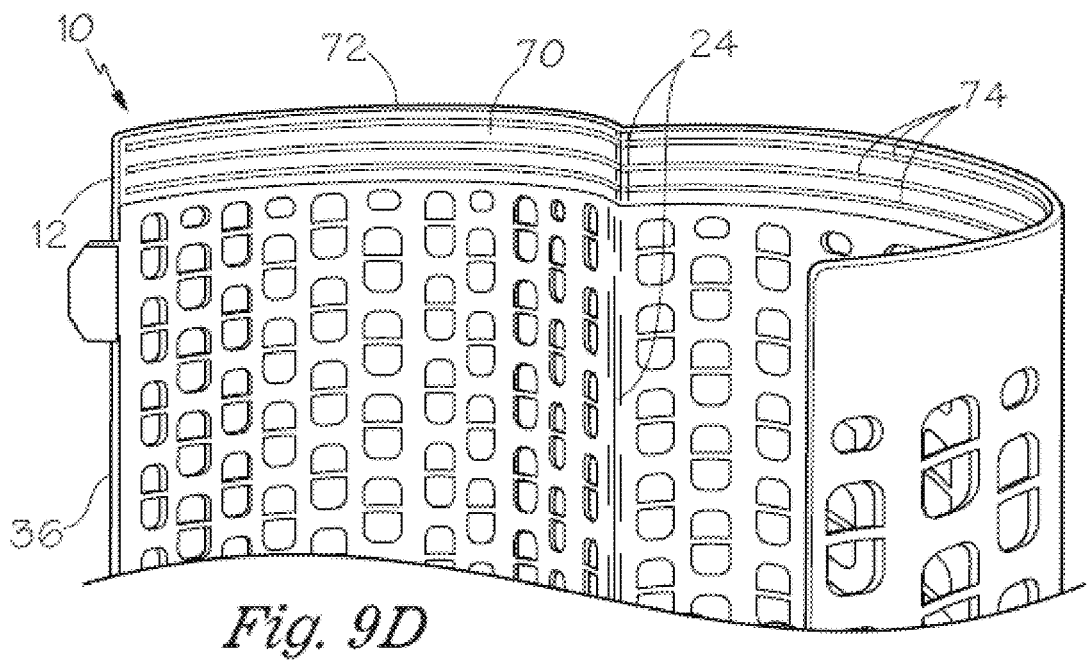
FIG. 9D shows a close up view of a first end of one embodiment of a sheath of the current disclosure in open position.

FIG. 9C shows a close up view of second end 30 of sheath 10 in open configuration 36. This view also shows that outer mating surface 64, which may contain surface modification 66, such as changing the texture of the outer surface to increase frictional engagement, to provide for stronger attachment between two joined sheaths 10. FIG. 9D shows a close up view of a first end 12 of sheath 10 in open configuration 36.

Figure 10:
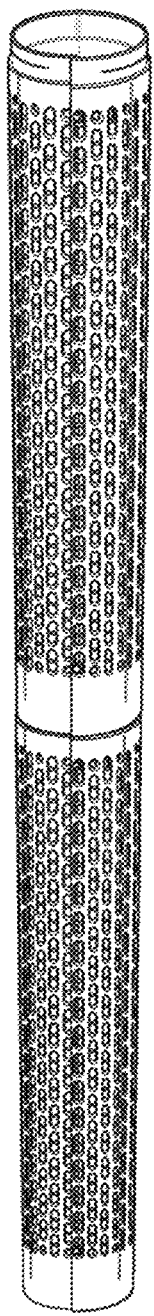
FIG. 10 shows two sheaths of the current disclosure joined to one another.
Figure 11:
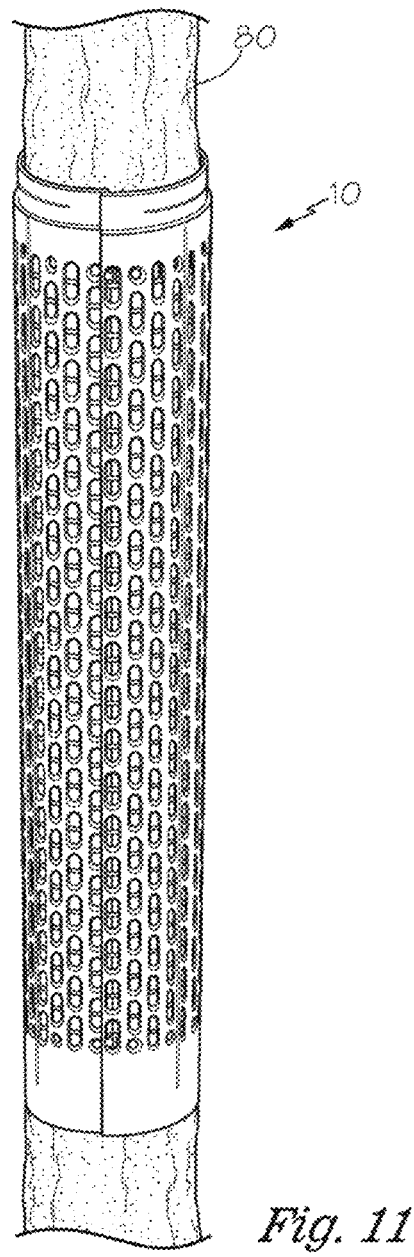
FIG. 11 shows a sheath of the present disclosure engaged with a plant.
Figure 12:
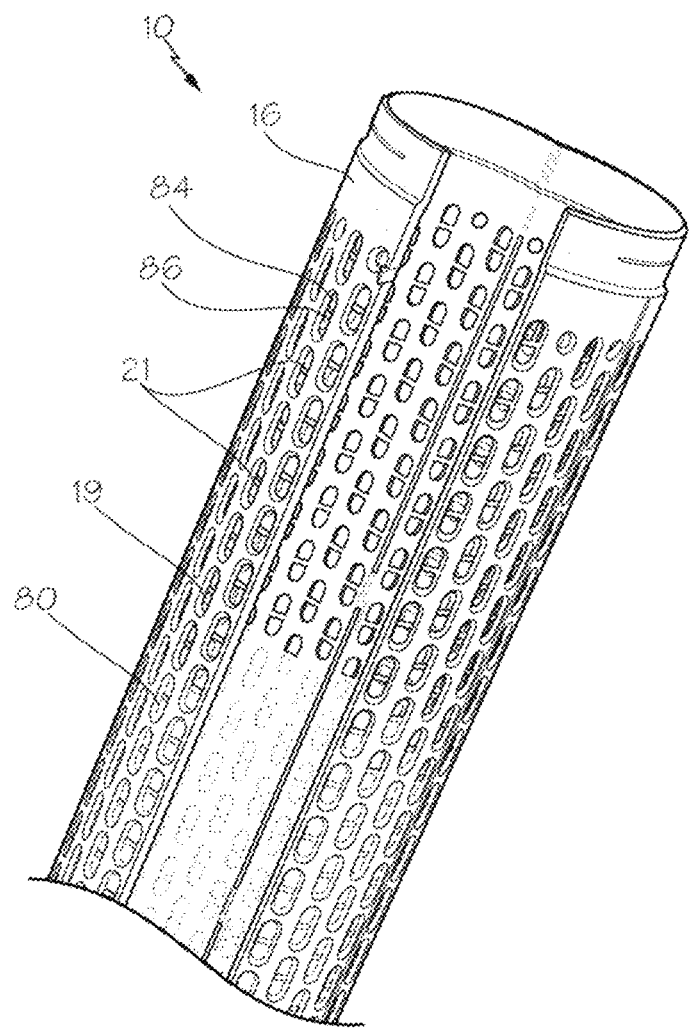
FIG. 12 shows an alternative embodiment of a sheath of the current disclosure wherein a portion of the voids defined in the sheath are blocked via partitions.

FIG. 10 shows two sheaths 10 joined to one another as described supra. FIG. 11 shows a sheath of the present disclosure engaged with a plant. FIG. 12 shows an alternative embodiment of sheath 10 wherein some of voids 19 defined in continuous sidewall 16 are blocked via partitions 80. The amount of voids 19 blocked by partitions 80 may be selectively designed such as percentages of blocked voids such as 10, 20, 30, 40, 50, 60, 70, 80, 90, or variations between these percentages, which are considered disclosed herein, or completely blocked. Indeed, void 19 may be configured with at least one sidewall aperture crossbar 21 such that void 19 may be subdivided into two or more sections, such as a first section 84 and a second section 86, and these sections may be open or closed based on the desired implementation for sheath 10. While only two sections are discussed herein, more or less sections are considered within the scope of this disclosure. This allows for further choosing to restrict or allow wind flow, sunlight access, liquid contact, pest access, etc., with respect to the coverage of sheath 10. Essentially, sheath 10 may be "programmed" by changing its configuration to specifically suit a particular plant variety.

In a further embodiment, a method of use is disclosed wherein a sheath 10, as shown in FIG. 12, may be inverted or flipped during use. In this embodiment, voids 19 and partitions 80 may be switched from their original placement on the plant. For example, if a sheath 10 as shown in FIG. 12 was placed on a plant such that voids 19 are close to the ground with partitions 80 placed higher on the stem of the plant, this orientation may be reversed by simply opening sheath 10 and placing the section with open voids 19 higher on the plant and placing partitions 80 close to the ground. This change may be necessary or desired when pesticides, fertilizers, etc., may be introduced to the growing area and it is desired to shield or protect the plant from this application. Further, inverting or flipping sheath 10 also introduces the "male" end of sheath 10 into the ground and provides increased stability for sheath 10 on the plant.

Figure 13:
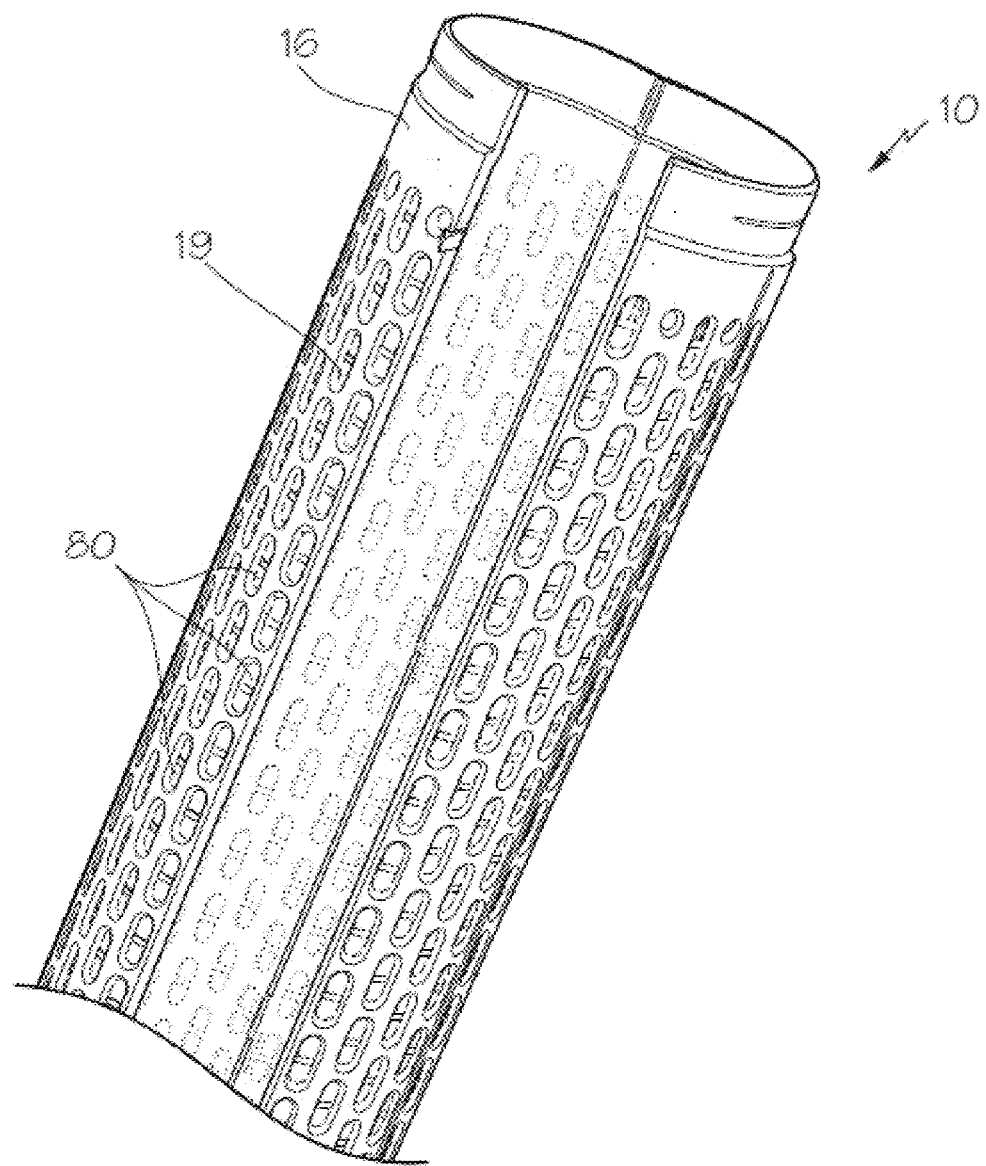
FIG. 13 shows a further embodiment of a sheath of the current disclosure wherein substantially all voids are blocked via partitions.

FIG. 13 shows a further embodiment of sheath 10 wherein substantially all voids 19 are blocked via partitions 80. Thus, these embodiments allow the user to select the desired protection for the enclosed plants. For plants requiring significant protection, voids 19 may be filled with partitions 80 for further limit access to the plant within sheath 10.

Figure 14:
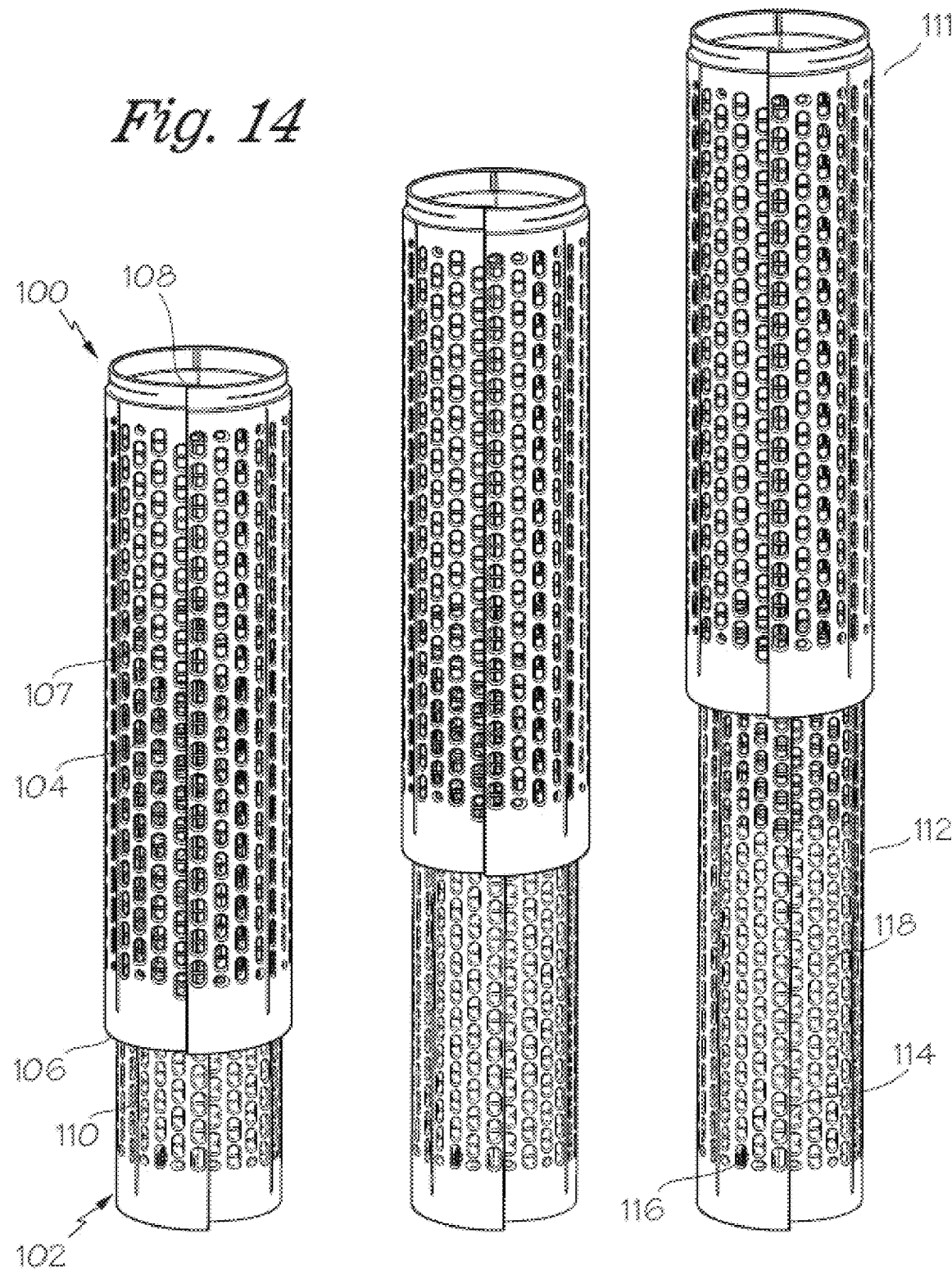
FIG. 14 shows a first sheath of the current disclosure encircling a second sheath of the current disclosure.

In a further embodiment, as shown by FIG. 14, multiple sheaths may be affixed to one another to achieve variable heights. For instance, as FIG. 14 shows, first sheath 100 may be affixed to second sheath 102 via first sheath 100 encircling second sheath 102 and forming overlap region 104, outer overlap border 106, and inner overlap border 107 wherein a portion of inner surface 108 of first sheath 100 at least partially surrounds outer surface 110 of second sheath 102. This allows a user to precisely cover a plant enclosed within first sheath 100 and second sheath 102. While only two sheaths are shown in FIG. 14, more sheaths are considered within the scope of this disclosure such as 3, 4, 5, 6 or more sheaths. Moreover, first sheath 100 may fully, substantially fully, or partially encircle outer surface 110 of second sheath 102. Affixation of first sheath 100 to second sheath 102 may be accomplished by frictional engagement in order to avoid requiring additional tools or affixment means being required to connect and secure first sheath 100 to second sheath 102.

In a further embodiment, sheath 100 has a closed orientation 110 and sheath 102 has a closed orientation 112 and both may be in their respective closed orientations when engaged. This may be accomplished by sizing sheath 100 so that its inner circumference 110 is larger than the outer circumference of sheath 102, when both are in the locked configuration 110 and 112. This may be also be accomplished by placing circumferential locking mechanisms 114 within sheath 100 and sheath 102 such that the circumference of the sheaths may be adjusted by using the circumferential locking mechanisms 114 to reduce the circumference of the inner sheath by overlapping a first surface 116 and second surface 118 of the inner sheath. Thus, different sized sheaths are not necessary as the circumference of a sheath may be adjusted to slide within a second sheath. In a still further embodiment, locking mechanisms 114 may be omitted and inner sheath 102 may reduce its circumference simply by having first surface 116 partially cover second surface 118 and frictionally engage same with first sheath 100 holding surfaces 116 and 118 of sheath 102 in this configuration.

Figure 15:
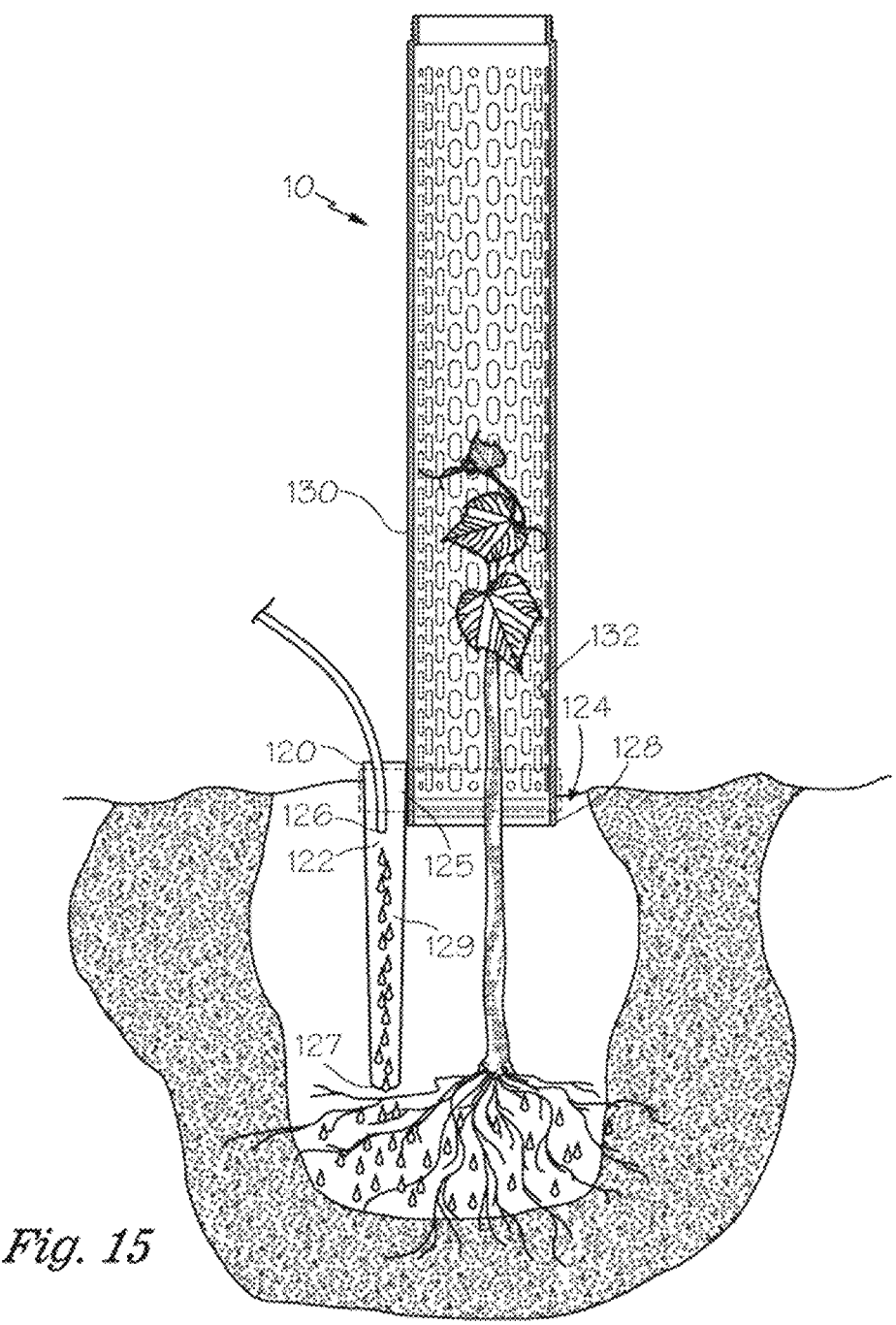
FIG. 15 shows a sheath of the current disclosure used in association with an irrigation tube/anchor.
Figure 16A:
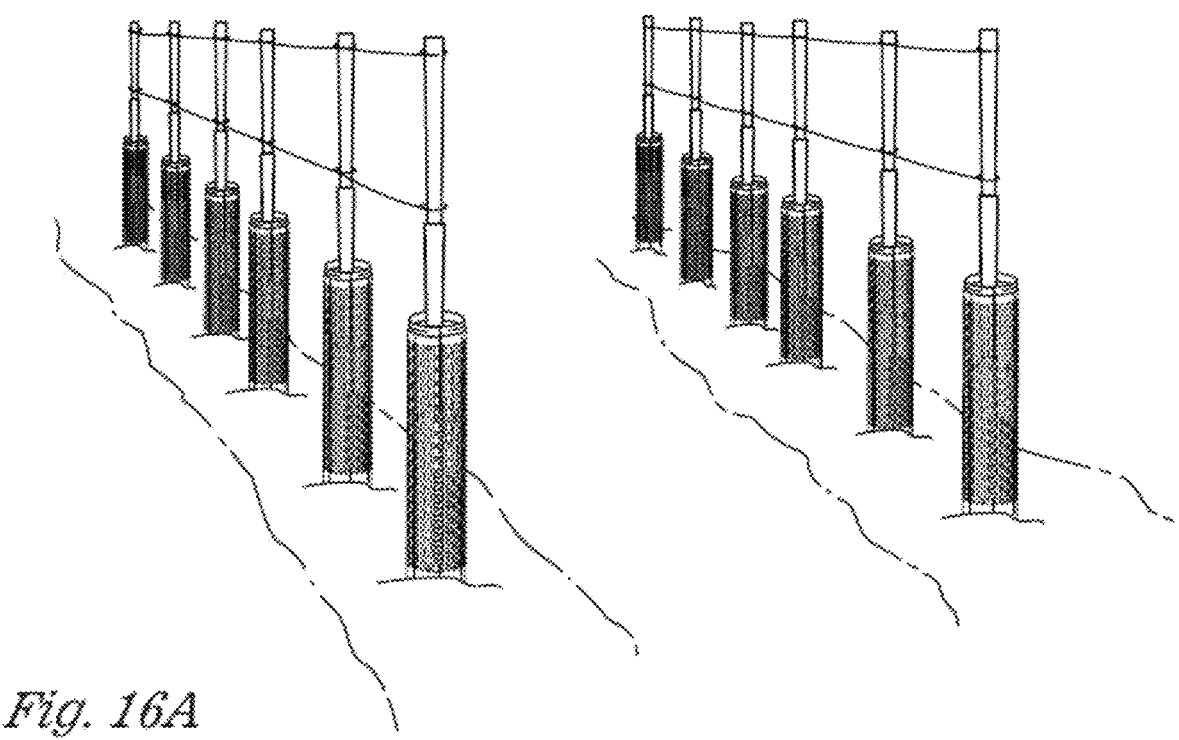
FIG. 16 A shows a photograph of a test field using sheaths of the current disclosure.
Figure 16B:
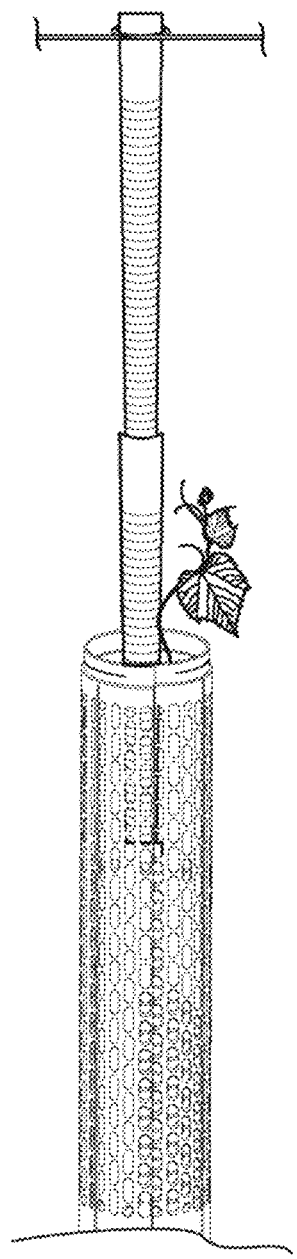
Figure 16C:
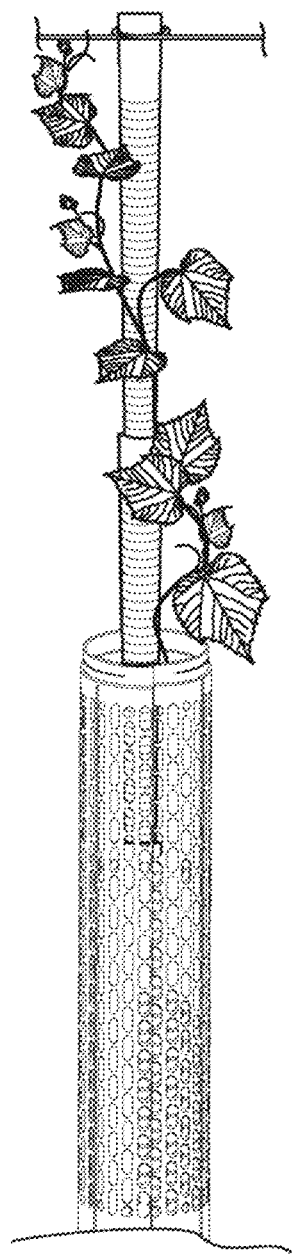
Figure 16D:
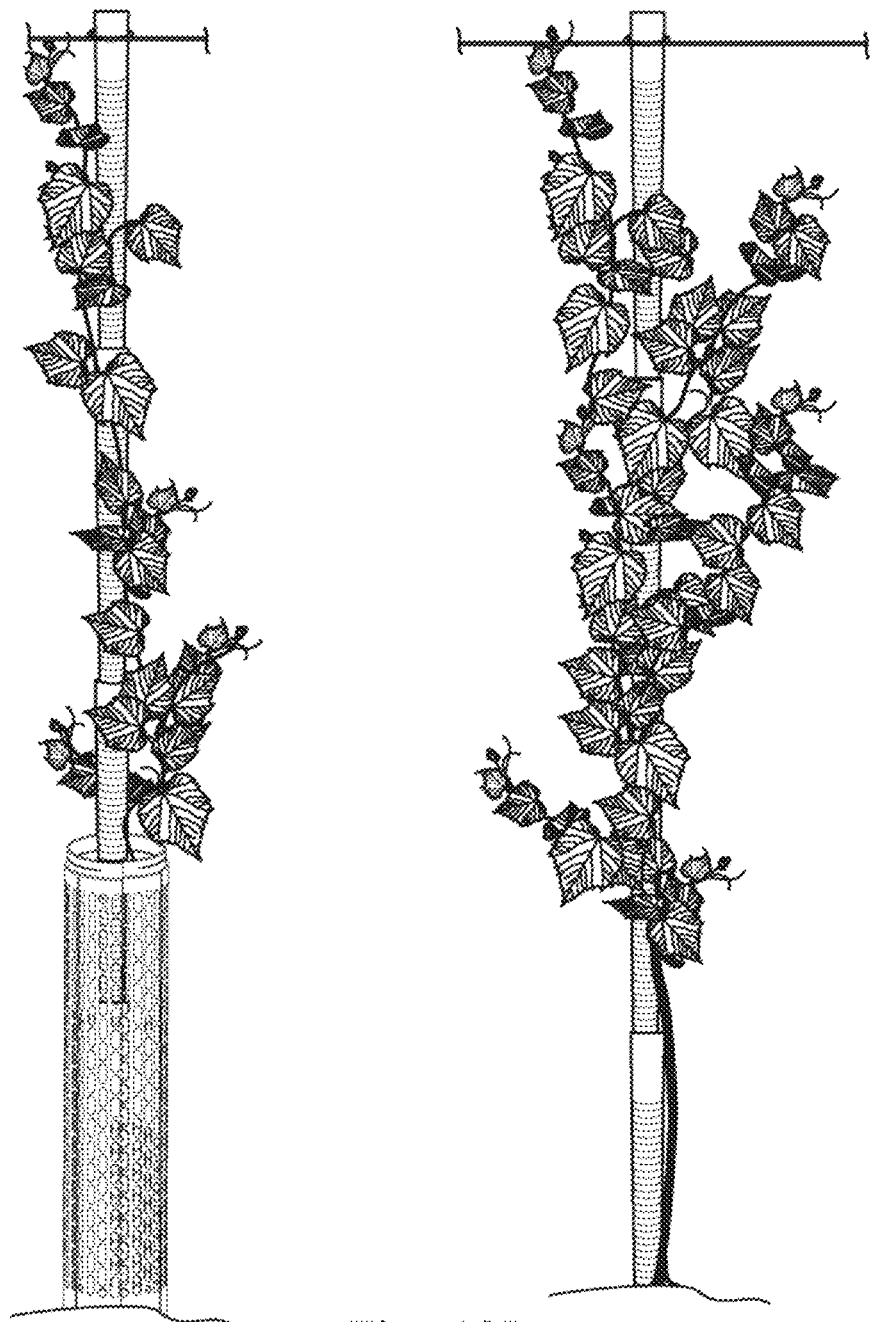
Figure 16E:
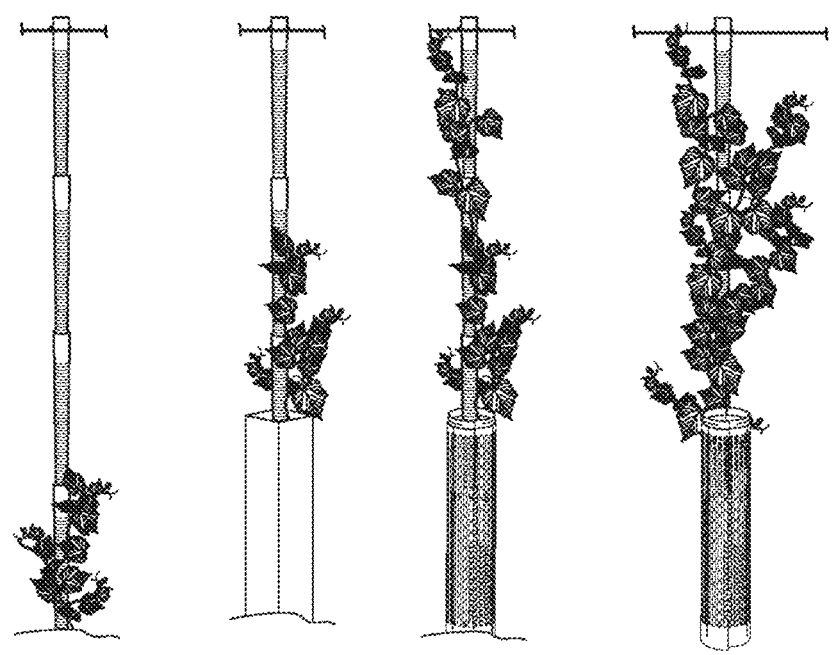

FIG. 15 shows one embodiment of a sheath 10 that includes an irrigation tube/anchor 120. Tube/anchor 120 may be formed from metals, plastics, nonwovens, synthetics, non-biodegradable materials, biodegradable materials, recycled materials, etc., as known to those of skill in the art. In one embodiment, tube/anchor 120 may be formed in the shape of a conical tube comprising a body wall 123 that tapers from an upper end 125 to a lower end 127 and a hollow interior 129. Tube/anchor 120 may be formed with an engagement lip 122 that frictionally engages with bottom 124 of sheath 10. In one embodiment, engagement lip 122 is a curved opening formed in body wall 123 of tube/anchor 120 that allows anchor/tube 120 to slide over ground engaging portion 128 of sheath 10 by frictionally engaging, or otherwise affixing to outer surface 130 and inner surface 132 of sheath 10, as known to those of skill in the art. In this way, tube/anchor 120 may serve two purposes. First, it anchors sheath 10 into the growth media used with the plant. Second, because anchor/tube 120 has a hollow interior 129, it may be used as an access to the root zone of the plant to water or provide liquid nutrients to the root zone of the plant enclosed within sheath 10. In one embodiment, Tube 120 may be provided in a kit with sheath 10 and may be employed as the user determines.

In a further embodiment, the sheath of the current disclosure may be used to provide and/or create a favorable microclimate to stimulate plant growth. It is believed that use of the sheaths on plants promotes apical dominance and encourages vertical plant growth, while curbing unnecessary or undesired lateral/horizontal growth, resulting in improved plant height and maturation. Sheath 10 is believed to encourage plant growth by providing a special ventilated microclimate that improves the rate of growth of young plants while also protecting the plants from harm.

Plants enclosed within sheath 10 breathe even at high temperatures due to the structure of sheath 10, described supra, and in the case of embodiments with open voids allows fertilizers access to the plant and surrounding ground while simultaneously shielding the plant from damage from wind, machinery, and animals that may enter the growing area. FIG. 16 A shows a test field using sheaths of the current disclosure. FIG. 16 B shows a young plant of the test group enclosed within a sheath of the current disclosure. FIG. 16 C shows further growth of one test plant enclosed within a sheath of the current disclosure during the field experiment. FIG. 16 D shows even further growth of a test plant enclosed within a sheath of the current disclosure. FIG. 16 E shows plants enclosed in a sheath of the current disclosure demonstrating improved growth over plants using other types of enclosures and no enclosures.

FIG. 17 shows Table 1, which provides growth data for plants using one embodiment of a sheath of the current disclosure as compared to plants without a protective enclosure and plants using simply a solid enclosure surrounding the plant. Use of the sheaths of the current disclosure resulted in the fastest growth rate ever recorded for the test plants as well as provided a drastically decreased mortality rate amongst plants enclosed within the sheaths. For example, as shown by FIG. 17, plants enclosed in a sheath of the current disclosure experienced significant growth over unprotected plants, 255 cm versus 140 cm height—an 82.14% increase in height, as well as significant growth over plants in different types of enclosures, 255 cm versus 210 cm height—a 17.65% increase in height. Thus, sheaths of the current disclosure show the unexpected result of improving plant growth and decreasing plant mortality as compared to plants using no sheath and a solid sheet surrounding plants as opposed to a sheath of the current disclosure.

Figure 18:
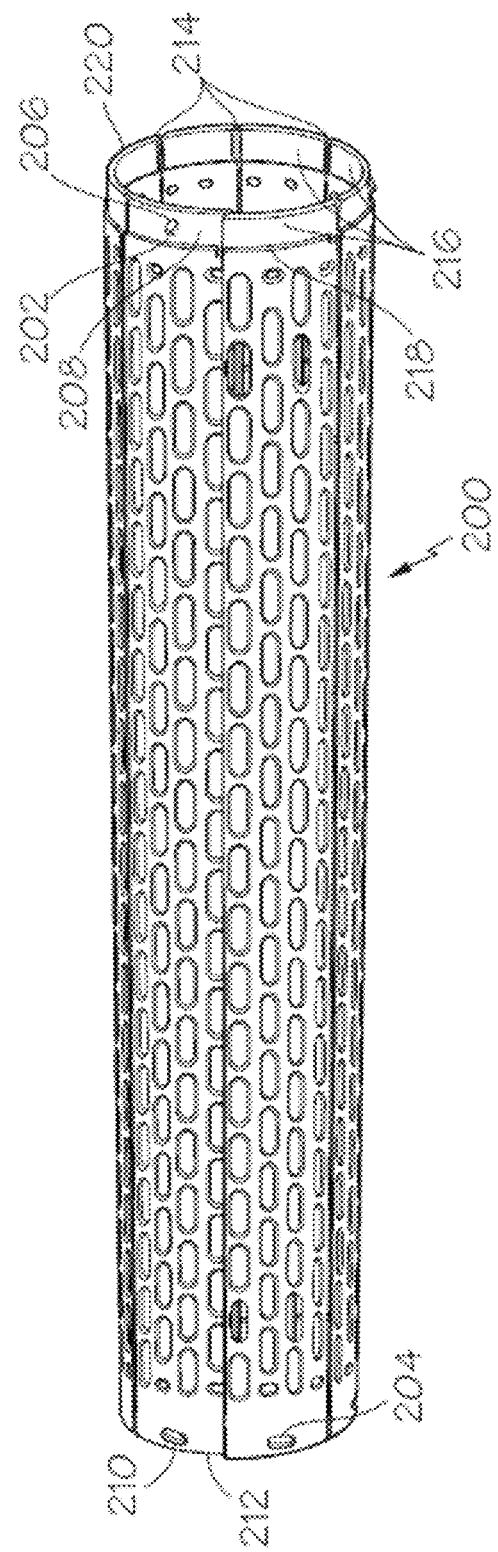
FIG. 18 shows an alternative embodiment of a plant sheath of the current disclosure.

In a further embodiment, see FIG. 18, a plant sheath 200 may be designed to possess at least one engagement nib 202 and at least one engagement orifice 204. The current disclosure is not limited to the number of nibs 202 and orifices 204 that may be added to plant sheath 200 and should not be read to restrict the current disclosure to a particular number of nibs 202 or orifices 204. In a further embodiment, nib 202 may possess an angled face 206 that forms an obtuse angle with plant sheath upper wall 208. Angle face 206 on a first plant sheath, not show, is designed to engage with an engagement orifice 204 on a second plant sheath. The angle of engagement nib 202 assists with conjoining sheaths in a "stacked" fashion wherein one sheath rests atop another sheath, see FIG. 10. Further, engagement orifice 204 may have orifice cant angle 210, wherein orifice 204 forms an acute angle with plant sheath bottom 212. Further, orifice 204 may be positioned to be nonparallel to plant sheath bottom 212. The "lay flat" feature may be obtained by recessing the flexible hinges and increasing the width of the vertical voids between the sections, in order to allow the sections to lay flat. As discussed herein, nibs 202 and orifices 204 may frictionally engage with one another via male/female engagement, hook and loop engagement, clasps, anchors, twist mechanisms that insert and twist to secure, barbs, bumps, grooves, mating grooves, openings, channels, surface roughening, coverings, and coatings, etc., as known to those of skill in the art, to ensure cooperate and engagement between nibs 202 and orifices 204 to secure plant sheaths 200 to one another in an end-to-end fashion. When a first plant sheath engages a second plant sheath, at least one nib 202 engages on the first sheath engages with at least one orifice 204 on the second sheath. The "bottom" 212 of second sheath may rest on securement ridge 218 positioned proximate the "top" 220 of sheath 200; however, as the sheaths may be inverted during use, "bottom" and "top" are relative terms depending on the orientation of the sheath around the object it is protecting.

Figure 19A:
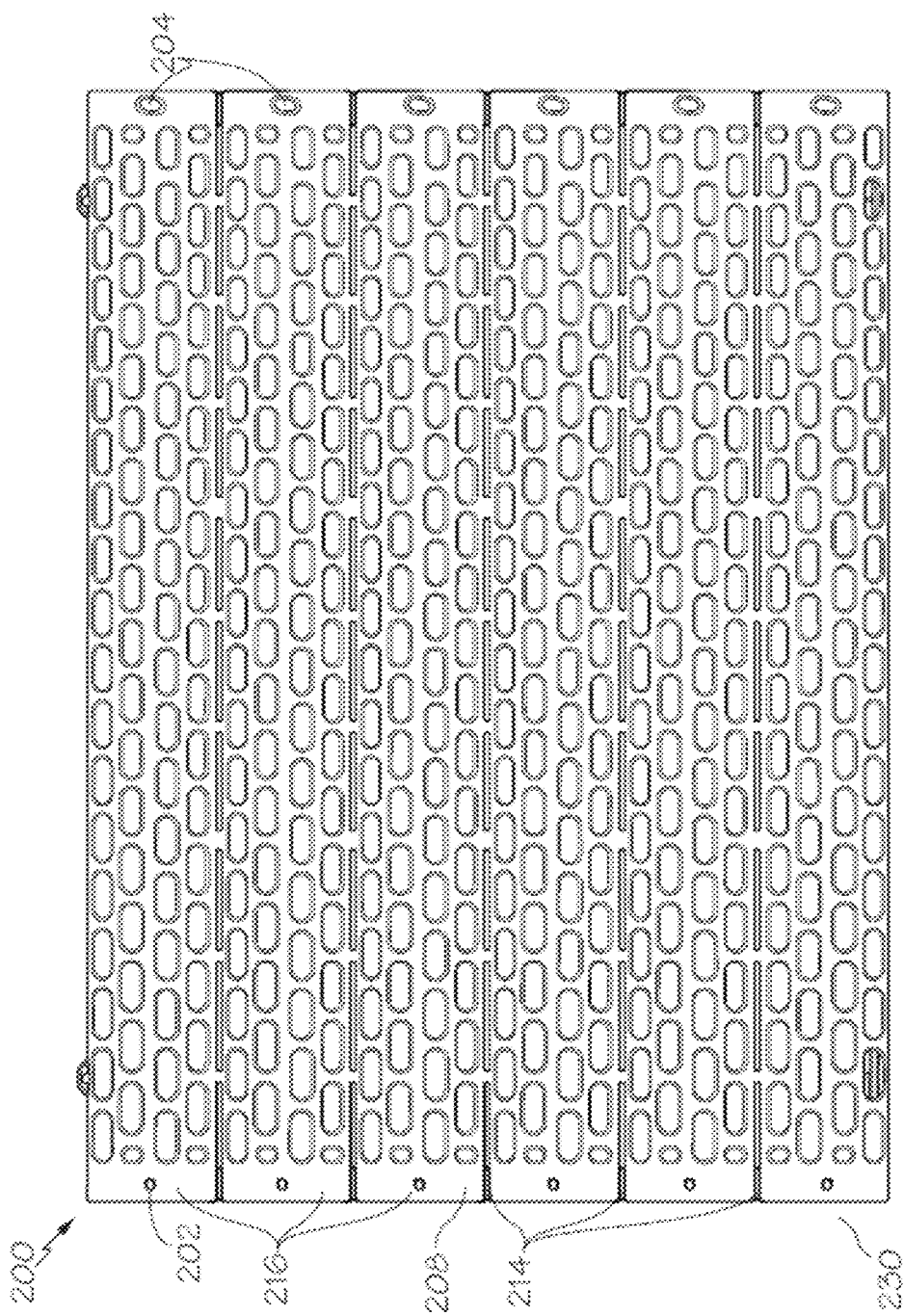
FIG. 19A shows an alternative embodiment of the current disclosure in a flat configuration.
Figure 19B:
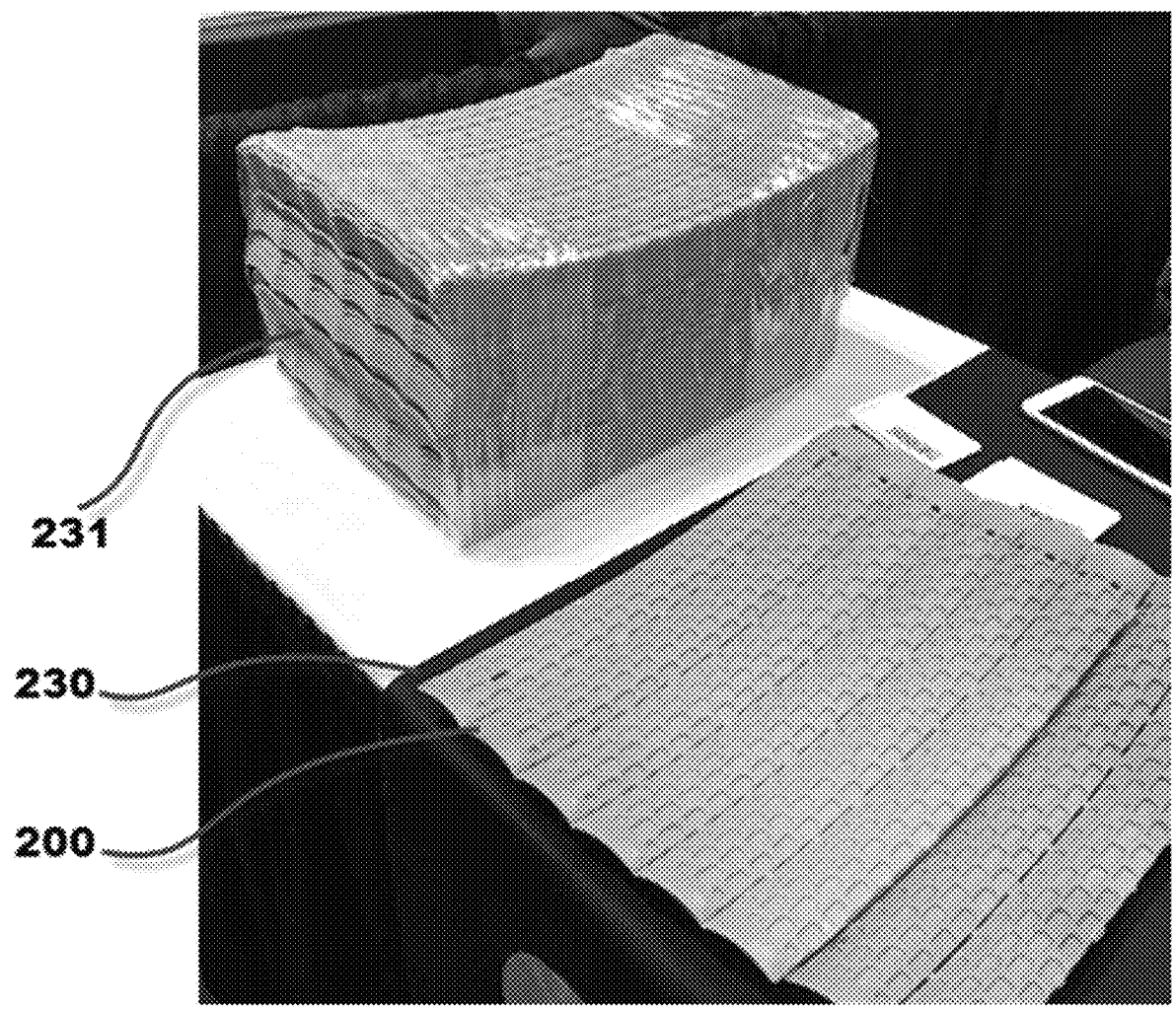
FIG. 19B shows a photograph of a stack of plant sheaths in flat configuration.

Plant sheath 200 may also possess at least one section hinge 214 that divides plant sheath 200 into sheath sections 216. The number of sheath sections 216 may vary and the current disclosure should not be considered limited in this aspect as there may be 2, 3, 4, 5, 6, 7, or more sections formed within plant sheath 200. One benefit provided by sheath sections 216 is that they may be formed to allow plant sheath 200 to open and form flat configuration 230, see FIG. 19. In flat configuration 230, plant sheaths 200 may be stacked atop one another in a flattened form for efficient transport, or storage when not in use, as opposed to having the sheath retain a columnar shape and require more shipping volume to ship the same mass. FIG. 19B shows a photograph of a stack 231 of plant sheaths 200 in flat configuration 230. Flat configuration 230 may be obtained by recessing section hinges 214 and increasing the distance between sheath sections 216 in order to allow the sections to lay flat with respect to one another.

Figure 20:
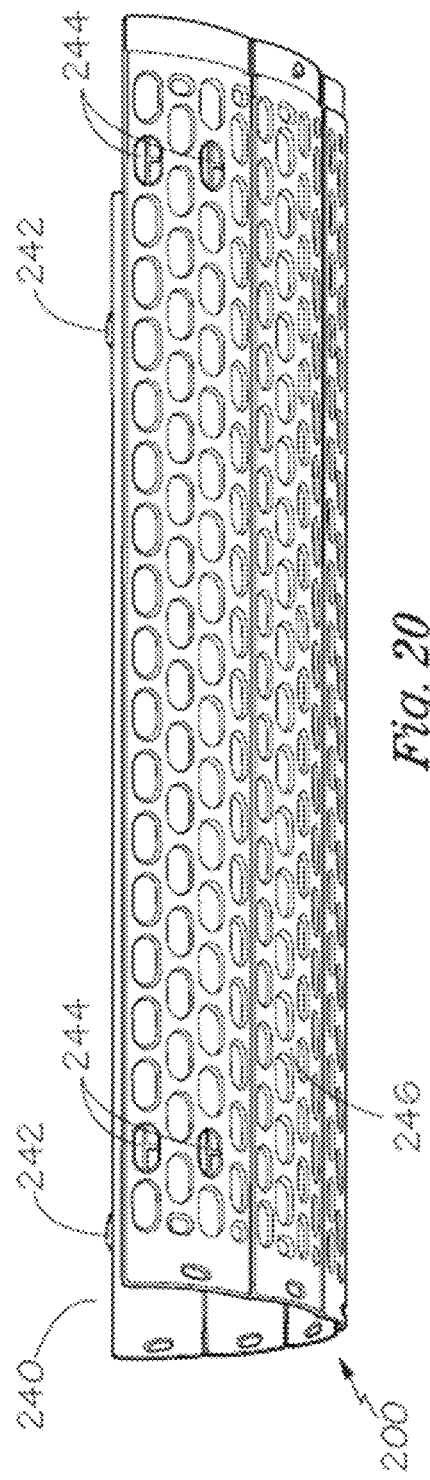
FIG. 20 shows an alternative embodiment plant sheath in an open configuration.

FIG. 20 shows plant sheath 200 in open configuration 240. Plant sheath 200 may also include engagement tabs 242 and engagement bars 244. As FIG. 20 illustrates, engagement bars 244 may be positioned at various locations in exterior 246 in order to allow a user to control the diameter of plant sheath 200 by selectively engaging tabs 242 with various bars 244 located at different points defined in exterior 246. While only two engagement bars 244 are shown in FIG. 20, the current disclosure is not so limited and engagement bars may be placed throughout the exterior 246 of sheath 200. As discussed herein, engagement tabs 242 and engagement bars 244 may frictionally engage with one another via male/female engagement, hook and loop engagement, clasps, anchors, twist mechanisms that insert and twist to secure, barbs, bumps, grooves, mating grooves, openings, channels, surface roughening, coverings, and coatings, etc., as known to those of skill in the art, to ensure cooperate and engagement between engagement tabs 242 and engagement bars 244 to lock plant sheath 200 in its closed position.

Figure 21:
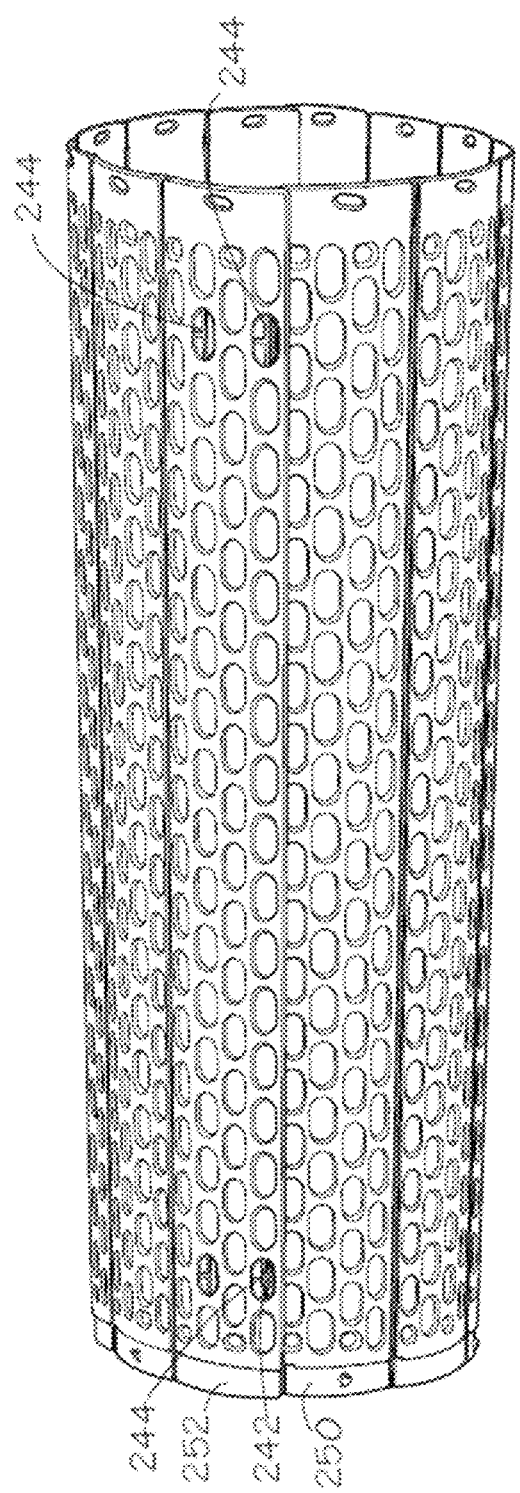
FIG. 21 shows a first plant sheath joined laterally to a second plant sheath.

FIG. 21 shows a first plant sheath 250 joined laterally to a second plant sheath 252. This may be accomplished by engaging engagement tab 242 of first plant sheath 250 with an engagement bar 244 located on second plant sheath 252. In this way, a user may continue to expand the diameter protected within the conjoined plant sheaths in order to accommodate bushes, large diameter trees, entire plants, etc.

Figure 22:
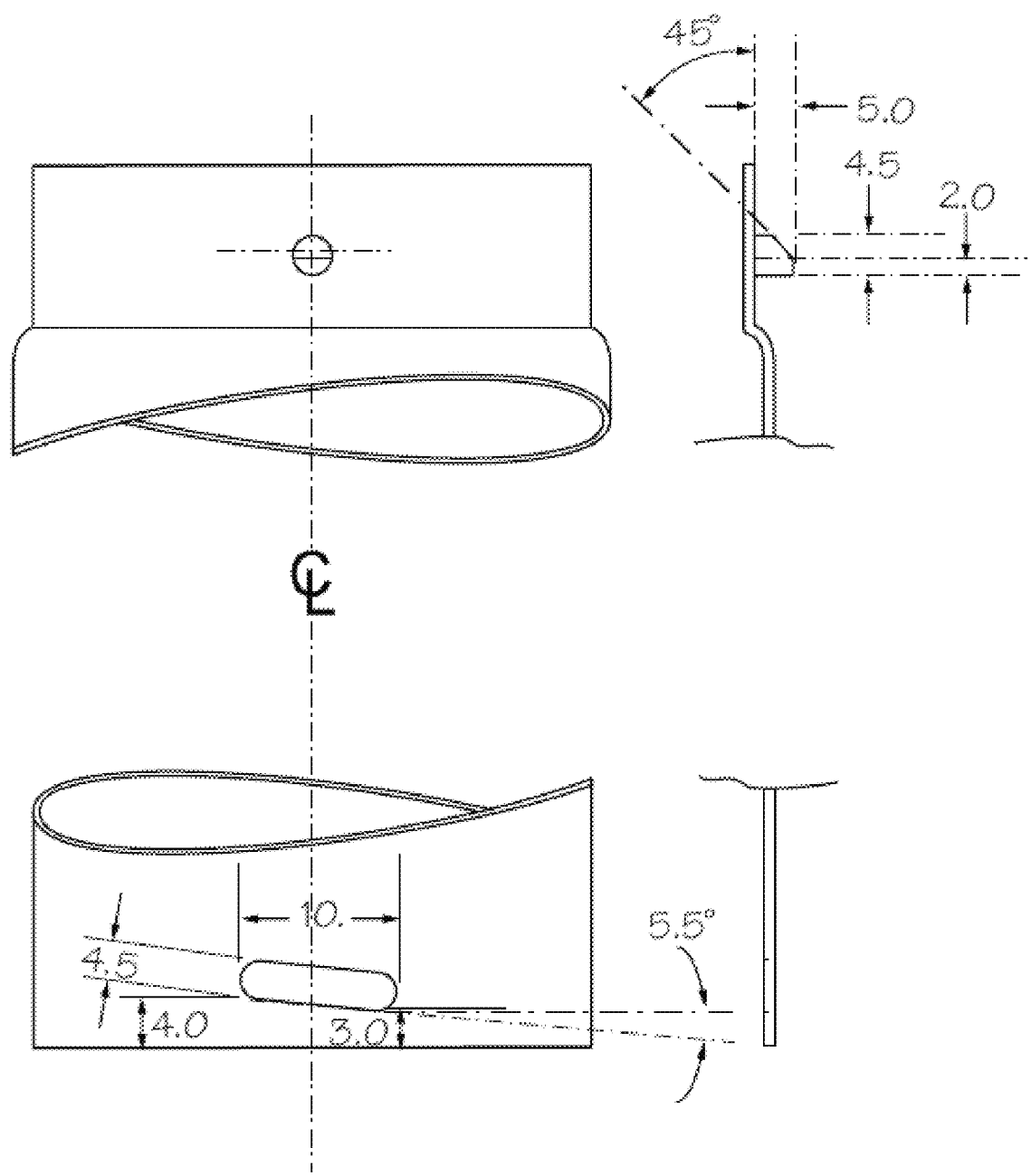
FIG. 22 shows one possible embodiment for forming engagement nib and engagement orifice.

FIG. 22 shows one possible embodiment for forming engagement nib 202 and engagement orifice 204. Nib 202 may have dimensions ranging from 2.0 to 6.0 mm. In a preferred embodiment, engagement nib 202 is 2.5 mm. The face of nib 202 may form an angle of rom 0 to 65 degrees with respect to plant sheath 250. In a preferred embodiment, the face may be at a 45 degree angle. With respect to orifice 204, the orifice may be at an angle of from 0 to 10 degrees.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A protective sheath comprising:
   an enclosing body capable of being repeatedly opened and closed;
   at least one locking tab defined on the enclosing body;
   at least one locking slot, defined within the enclosing body, that accommodates the locking tab;
   at least one flexible hinge defined in the enclosing body;
   at least one engagement nib formed on the enclosing body;
   at least one engagement orifice, defined in the enclosing body, that accommodates the at least one engagement nib; and
   wherein the enclosing body closes to define an interior diameter and forms a column shape with opposing first open aperture and second open aperture located at both ends of the enclosing body, wherein first open aperture also forms a recessed, substantially circular securement ridge on an exterior of the first open aperture for engagement with the second open aperture of a second protective sheath.

2. The protective sheath of claim 1, wherein the protective sheath opens to form a flat configuration.

3. The protective sheath of claim 1, wherein there are at least two flexible hinges.

4. The protective sheath of claim 1, wherein the engagement nib comprises at least one angled face.

5. The protective sheath of claim 1, wherein the engagement orifice is non parallel to an end of the protective sheath.

6. The protective sheath of claim 1, wherein a first sheath vertically engages with a second sheath via the at least one engagement nib of the first sheath and the at least one engagement orifice of the second sheath in association with the securement ridge supporting the uppermost sheath of the vertically engaged sheaths.

7. The protective sheath of claim 1, wherein the internal diameter defined by the enclosing body expands or contracts and locks in the expanded or contracted position via the at least one locking tab engaging different locking slots defined within the enclosing body.

8. The protective sheath of claim 1, wherein a first sheath laterally engages to a second sheath via the at least one locking slot of the first sheath engaging with the at least one locking tab of the second sheath.

9. The protective sheath of claim 1, wherein voids are defined within the enclosing body.

10. The protective sheath of claim 9, wherein potions of the voids are at least partially filled.

11. The protective sheath of claim 1, wherein the enclosing body comprises at least two body segments.

12. A microenvironment container comprising:
    an encompassing body having an adjustable internal diameter, wherein the encompassing body forms a column shape with opposing first open aperture and second open aperture located at both ends of the encompassing body, wherein first open aperture also forms a recessed, substantially circular securement ridge on an exterior of the first open aperture for engagement with the second open aperture of a second encompassing body;
    at least one locking prong defined on the encompassing body;
    at least one locking trench, defined within the encompassing body, that accommodates the locking prong;

at least two flexible hinges defined in the encompassing body;

at least one extension prong formed on the encompassing body; and at least one extension orifice, defined in the encompassing body, that accommodates the at least one extension prong.

13. The microenvironment container of claim 12, wherein the encompassing body opens to form a substantially flat configuration.

14. The microenvironment container of claim 12, wherein the extension prong comprises at least one face that forms an obtuse angle with an exterior of the encompassing body.

15. The microenvironment container of claim 12, wherein engagement orifice is located adjacent an end of the encompassing body and is non parallel to the end of the encompassing body.

16. The microenvironment container of claim 12, wherein a first encompassing body vertically engages a second encompassing body via the at least one extension prong of the first encompassing body and the at least one extension trench of the second sheath.

17. The microenvironment container of claim 12, wherein the internal diameter defined by the encompassing body expands or contracts and disengagingly locks in an expanded or contracted position.

18. The microenvironment container of claim 12, wherein a first enclosing body laterally affixes to a second enclosing body via the at least one locking prong of the first sheath engaging with the at least one locking orifice of the second sheath.

19. The microenvironment container of claim 12, wherein depressions are defined within the encompassing body.

20. The microenvironment container of claim 19, wherein potions of the depressions are at least partially open.

21. The microenvironment container of claim 12, wherein the encompassing body comprises at least three body segments.

22. An adjustable containment barrier comprising:

at least one nib and at least one orifice for vertical extension of the containment barrier;

at least one slot and at least one tab for lateral extension of the containment barrier;

a recessed, substantially circular securement ridge for accommodating vertical extension;

at least two flexible hinges formed in the containment barrier; and wherein the containment barrier forms an adjustable internal diameter, wherein the adjustable containment barrier locks into place to define at least two different internal diameters; and the adjustable containment barrier forms a column shape with opposing first open aperture and second open aperture located at both ends of the adjustable containment barrier, wherein first open aperture also forms the securement ridge on an exterior of the first open aperture for engagement with the second open aperture of a second adjustable containment barrier.

* * * * *